(12) United States Patent
Robinson

(10) Patent No.: US 8,651,726 B2
(45) Date of Patent: Feb. 18, 2014

(54) EFFICIENT POLARIZED DIRECTIONAL BACKLIGHT

(75) Inventor: Michael G. Robinson, Boulder, CO (US)

(73) Assignee: RealD Inc., Beverly Hills, CA (US)

( * ) Notice: Subject to any disclaimer, the term of this patent is extended or adjusted under 35 U.S.C. 154(b) by 0 days.

(21) Appl. No.: 13/470,291

(22) Filed: May 12, 2012

(65) Prior Publication Data

US 2012/0243204 A1 Sep. 27, 2012

Related U.S. Application Data

(63) Continuation-in-part of application No. 13/300,293, filed on Nov. 18, 2011.

(60) Provisional application No. 61/486,021, filed on May 13, 2011, provisional application No. 61/415,810, filed on Nov. 19, 2010.

(51) Int. Cl.
*F21V 7/04* (2006.01)

(52) U.S. Cl.
USPC ........................................... 362/624

(58) Field of Classification Search
USPC ........................................ 362/620, 624, 626
See application file for complete search history.

(56) References Cited

U.S. PATENT DOCUMENTS

| 5,959,664 | A | 9/1999 | Woodgate |
| 6,014,164 | A | 1/2000 | Woodgate et al. |
| 6,061,489 | A | 5/2000 | Ezra et al. |
| 6,075,557 | A | 6/2000 | Holliman et al. |
| 6,108,059 | A | 8/2000 | Yang |
| 6,199,995 | B1 | 3/2001 | Umemoto |
| 6,663,254 | B2 | 12/2003 | Ohsumi |
| 6,847,488 | B2 | 1/2005 | Travis |

(Continued)

FOREIGN PATENT DOCUMENTS

| EP | 0939273 | 1/1999 |
| EP | 0860729 B1 | 7/2006 |

(Continued)

OTHER PUBLICATIONS

International Search Report & Written Opinion for PCT/US12/37677 dated Jun. 29, 2012.

(Continued)

*Primary Examiner* — Alessandro Amari
(74) *Attorney, Agent, or Firm* — Neil G. J. Mothew; Darlene K. Kondo

(57) ABSTRACT

By introducing a stack of alternating high and low index dichroic material layers on the exit surface of a waveguide for a wedge type directional backlight, natural reflectivity differences between polarized components can be increased, effectively reflecting the vast proportion of S-polarized light rays, while at the same time transmitting the P-polarized light rays, of light impacting the exit surface of the waveguide at an angle sufficient to exit the waveguide. This recovers polarization in wedge type backlight systems, increasing illumination exiting the waveguide. Also, on the back reflecting surface of the waveguide, a birefringent material can be added to efficiently transform S-polarized reflected light from the dichroic stack, into returning P-polarized light. Because returning rays that are now P-polarized by the birefringent material have already achieved the critical angle for exiting the waveguide, the rays transformed to P-polarization can now also exit the waveguide, increasing waveguide illumination.

26 Claims, 29 Drawing Sheets

(56) References Cited

U.S. PATENT DOCUMENTS

| | | | |
|---|---|---|---|
| 6,870,671 B2 | 3/2005 | Travis | |
| 6,883,919 B2 | 4/2005 | Travis | |
| 7,058,252 B2 | 6/2006 | Woodgate | |
| 7,073,933 B2 | 7/2006 | Gotoh et al. | |
| 7,101,048 B2 | 9/2006 | Travis | |
| 7,215,415 B2 | 5/2007 | Maehara | |
| 7,410,286 B2 | 8/2008 | Travis | |
| 7,430,358 B2 | 9/2008 | Qi et al. | |
| 7,528,893 B2 | 5/2009 | Schultz | |
| 7,545,429 B2 | 6/2009 | Travis | |
| 7,660,047 B1* | 2/2010 | Travis et al. | 359/726 |
| 7,750,981 B2 | 7/2010 | Shestak | |
| 7,750,982 B2 | 7/2010 | Nelson | |
| 7,944,428 B2 | 5/2011 | Travis | |
| 7,970,246 B2* | 6/2011 | Travis et al. | 385/43 |
| 7,976,208 B2 | 7/2011 | Travis | |
| 8,016,475 B2 | 9/2011 | Travis | |
| 8,216,405 B2 | 7/2012 | Emerton | |
| 8,354,806 B2 | 1/2013 | Travis | |
| 8,477,261 B2 | 7/2013 | Travis | |
| 2003/0137738 A1* | 7/2003 | Ozawa et al. | 359/586 |
| 2004/0170011 A1 | 9/2004 | Kim et al. | |
| 2005/0264717 A1 | 12/2005 | Chien et al. | |
| 2006/0139447 A1 | 6/2006 | Unkrich | |
| 2006/0291053 A1 | 12/2006 | Robinson et al. | |
| 2006/0291243 A1 | 12/2006 | Niioka et al. | |
| 2007/0025680 A1* | 2/2007 | Winston et al. | 385/146 |
| 2007/0115551 A1 | 5/2007 | Spilman et al. | |
| 2007/0115552 A1* | 5/2007 | Robinson et al. | 359/495 |
| 2008/0084519 A1 | 4/2008 | Brigham et al. | |
| 2008/0086289 A1 | 4/2008 | Brott | |
| 2008/0225205 A1 | 9/2008 | Travis | |
| 2008/0304282 A1* | 12/2008 | Mi et al. | 362/607 |
| 2008/0316768 A1 | 12/2008 | Travis | |
| 2009/0016057 A1 | 1/2009 | Rinko | |
| 2009/0140656 A1 | 6/2009 | Kohashikawa et al. | |
| 2009/0160757 A1 | 6/2009 | Robinson | |
| 2009/0225380 A1 | 9/2009 | Schwerdtner et al. | |
| 2010/0053771 A1 | 3/2010 | Travis | |
| 2010/0091254 A1 | 4/2010 | Travis | |
| 2010/0177387 A1 | 7/2010 | Travis | |
| 2010/0188438 A1 | 7/2010 | Kang | |
| 2010/0214135 A1 | 8/2010 | Bathiche | |
| 2010/0220260 A1 | 9/2010 | Sugita et al. | |
| 2010/0231498 A1 | 9/2010 | Large | |
| 2010/0277575 A1 | 11/2010 | Ismael et al. | |
| 2010/0300608 A1* | 12/2010 | Emerton et al. | 156/242 |
| 2011/0032483 A1 | 2/2011 | Hruska et al. | |
| 2011/0044056 A1 | 2/2011 | Travis | |
| 2011/0187293 A1 | 8/2011 | Travis | |
| 2011/0188120 A1 | 8/2011 | Tabirian et al. | |
| 2011/0216266 A1 | 9/2011 | Travis | |
| 2011/0242298 A1 | 10/2011 | Bathiche | |
| 2011/0285927 A1 | 11/2011 | Schultz et al. | |
| 2012/0127573 A1* | 5/2012 | Robinson et al. | 359/464 |

FOREIGN PATENT DOCUMENTS

| | | | |
|---|---|---|---|
| EP | 2003394 A2 | 12/2008 | |
| JP | 08254617 A | 10/1996 | |
| JP | 08340556 A | 12/1996 | |
| JP | 2001093321 A | 4/2001 | |
| JP | 2002049004 A | 2/2002 | |
| JP | 2004319364 A | 11/2004 | |
| JP | 2005135844 A | 5/2005 | |
| JP | 2005-183030 A | 7/2005 | |
| JP | 2006-004877 A | 1/2006 | |
| JP | 2006031941 A | 2/2006 | |
| JP | 2008204874 A | 9/2008 | |
| KR | 10-2003-0064258 A | 7/2003 | |
| KR | 1020110006773 A | 1/2011 | |
| KR | 1020110017918 A | 2/2011 | |
| KR | 1020110067534 A | 6/2011 | |
| KR | 1020120048301 A | 5/2012 | |

OTHER PUBLICATIONS

International Search Report & Written Opinion for PCT/US11/61511 dated Jun. 29, 2012.

File History of U.S. Appl. No. 13/300,293 entitled "Directional flat illuminators", filed Nov. 18, 2011.

International search report and written opinion of international searching authority in PCT/US2012/042279 dated Feb. 26, 2013.

Tabiryan et al., "The Promise of Diffractive Waveplates," Optics and Photonics News, vol. 21, Issue 3, pp. 40-45, (Mar. 2010).

International search report and written opinion of the international searching authority from PCT/US12/52189 dated Jan. 29, 2013.

Kalantar, et al. "Backlight Unit With Double Surface Light Emission," J. Soc. Inf. Display, vol. 12, Issue 4, pp. 379-387 (Dec. 2004).

International Preliminary Report on Patentability in PCT/US2011/061511 dated May 21, 2013.

Travis, et al. "Backlight for view-sequential autostereo 3D".

International search report and written opinion of international searching authority for co-pending PCT application number PCT/US2013/041192 mailed Aug. 28, 2013.

International search report and written opinion of international searching authority for co-pending PCT application No. PCT/US2013/041619 mailed Aug. 27, 2013.

International search report and written opinion of international searching authority for co-pending PCT application No. PCT/US2013/041655 mailed Aug. 27, 2013.

International search report and written opinion of international searching authority for co-pending PCT application No. PCT/US2013/041703 mailed Aug. 27, 2013.

International search report and written opinion of international searching authority for co-pending PCT application No. PCT/US2013/041548 mailed Aug. 27, 2013.

International search report and written opinion of international searching authority for co-pending PCT application No. PCT/US2013/041683 mailed Aug. 27, 2013.

International search report and written opinion of international searching authority for co-pending PCT application No. PCT/US2013/041228 mailed Aug. 23, 2013.

International search report and written opinion of international searching authority for co-pending PCT application No. PCT/US2013/041235 mailed Aug. 23, 2013.

International search report and written opinion of international searching authority for co-pending PCT application No. PCT/US2013/041697 mailed Aug. 23, 2013.

* cited by examiner

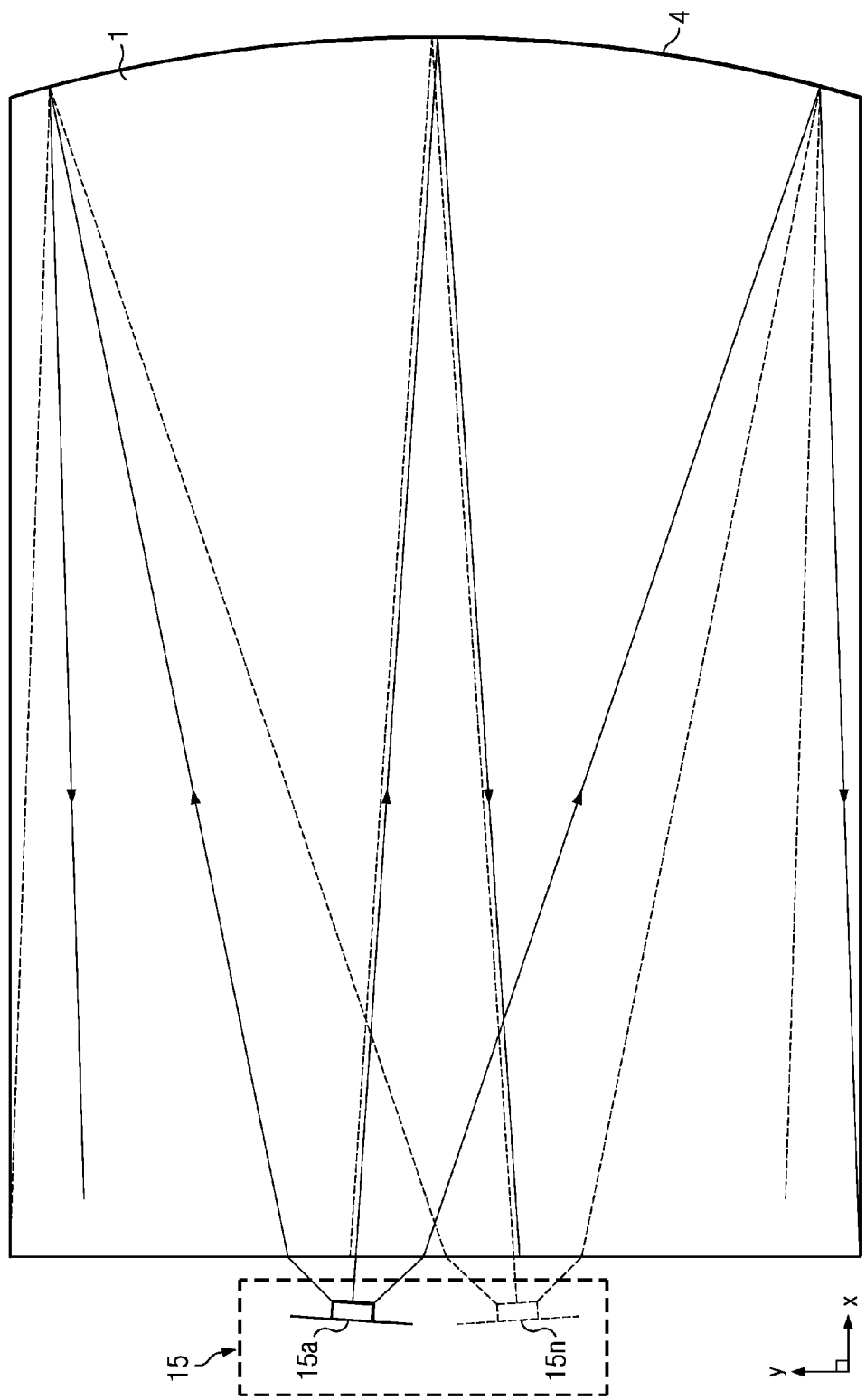

EFFICIENT POLARIZED DIRECTIONAL BACKLIGHT

CROSS-REFERENCE TO RELATED CASES

The present application is a conversion of and thus claims priority to U.S. Provisional Pat. App. Ser. No. 61/486,021, entitled "Efficient polarized directional backlight," filed May 13, 2011, which is incorporated herein by reference in its entirety. The present application further claims priority to and is a continuation in part of U.S. patent application Ser. No. 13/300,293, entitled "Directional flat illuminators," filed Nov. 18, 2011, which claims priority to U.S. Prov. Pat. App. Ser. No. 61/415,810, entitled "Directional flat illuminators," and filed Nov. 19, 2010, all of which are also herein incorporated by reference in their entirety.

TECHNICAL FIELD

The present disclosure generally relates to displays, and more specifically, to two dimensional and three dimensional display technologies and components.

BACKGROUND

Generally, current display technologies may include functionality to deploy, view and/or display three dimensional (3D) content. Recently, the increased demand for such functionality has driven the need for enhanced performance of display technology. Display technology may employ the use of plasma and liquid crystal displays (LCDs). Directional backlighting of LCDs provides efficient, private, large viewing angle, autostereoscopic and conventional 2D viewing. However, it may be difficult to use conventional approaches such as, 3M's Vikuiti™ Dual Brightness Enhancement Film (DBEF), to efficiently polarize output light for illuminating LCDs on top of the added complexity that directionality demands.

BRIEF SUMMARY

Display backlights in general employ waveguides and edge emitting sources. Certain imaging directional backlights have the additional capability of directing the illumination through a display panel into viewing windows. An imaging system may be formed between multiple sources and the respective window images. One example of an imaging directional backlight is an optical valve that may employ a folded optical system and hence may also be an example of a folded imaging directional backlight. Light may propagate substantially without loss in one direction through the optical valve while counter-propagating light may be extracted by reflection off tilted facets as described in patent application Ser. No. 13/300,293, which is herein incorporated by reference, in its entirety.

Polarization selective transmission of the highly collimated extracted light from a wedge type directional backlight element, such as the type disclosed in U.S. Pat. No. 7,970,246, which is incorporated herein by reference, can be enhanced by dichroic layers coated onto the exit surface performing a similar manner to a conventional polarizing beam splitter (PBS), as described in U.S. Pat. No. 2,403,731, entitled "Beam Splitter," which is also hereby incorporated by reference in its entirety. Physics naturally favors the transmission of P-polarized over S-polarized light; the former having its oscillating electric field in the incident plane. By introducing a stack of alternating high and low index dichroic material layers in accordance with the disclosed principles, the natural reflectivity differences between polarized components can be increased, effectively reflecting the vast proportion of S-polarized light rays, while at the same time transmitting the P-polarized light rays, of light impacting the exit surface of the waveguide at an angle sufficient to exit the waveguide. The more dichroic layers, the greater the angular and wavelength range over which both high P-transmission and S-reflection is achieved. Unlike a conventional PBS, few layers, for example, approximately three, may be employed to achieve approximately 90% polarized transmission due to the high collimation and large incident angles of light rays that exit the wedge type directional backlight system.

In addition to the above principles, on the back reflecting surface of the waveguide, a birefringent material can be added to efficiently transform the S-polarized reflected light from the dichroic stack, into returning P-polarized light. Because the returning rays that are now P-polarized by the birefringent material have already achieved the critical angle for exiting the waveguide, the rays transformed to P-polarization can now also exit the waveguide. This is preferred currently over any introduction of birefringence into, or any residual birefringence in, the wedge waveguide's substrate material as it can be tightly controlled. The prescription for the birefringent material is determined by the critical angle of the waveguide material, as will be discussed later.

Thus, in accordance with the above-mentioned principles, one aspect of the present disclosure provides an illumination system for use with an electronic display system. In one embodiment, the illumination system may comprise an optical waveguide having a near end and a reflecting far end, wherein a thickness of the waveguide at the reflecting end is greater than a thickness at the near end. In addition, the waveguide may further comprise an exit surface extending between the near and far ends, and have a critical angle above which light rays may exit the waveguide. The reflecting far end preferably includes at least one corrugation or similar facet, as well as being curved along a plane substantially parallel to a plane of the exit surface. Exemplary illumination systems may also comprise at least one dichroic layer located on the exit surface of the waveguide, where the at least one dichroic layer is configured to pass exiting light rays having a first polarization and to reflect exiting light rays having a second polarization, different than the first polarization, back through the exit surface. Additionally, such embodiments may also include a polarization conversion film located on a surface of the waveguide that is opposite the exit surface. Such a polarization conversion film may be configured to transform the polarization of at least some of the light rays having the second polarization that are reflected by the at least one dichroic layer into light rays having the first polarization. The polarization conversion film may be configured to reflect the transformed light rays having the first polarization back into the waveguide such that at least a portion of the transformed light rays having the first polarization back into the waveguide such that they may exit the waveguide and pass through the at least one dichroic layer.

In other embodiments, an electronic display system is provided. In exemplary embodiments, such a display system may comprise an optical waveguide having a near end and a reflecting far end, where a thickness of the waveguide at the reflecting end is greater than a thickness at the near end. The waveguide may further comprise an exit surface extending between the near and far ends and have a critical angle above which light rays may exit the waveguide. The reflecting far end preferably includes at least one corrugation, as well as being curved along a plane substantially parallel to a plane of the exit surface. Such display systems may include at least one illumination unit configured to transmit lights rays into the waveguide through the near end. Moreover, such display systems may include at least one dichroic layer located on the exit surface of the waveguide, wherein the at least one dichroic layer is configured to pass P-polarized light rays exiting the waveguide and to reflect S-polarized light rays exiting the waveguide back through the exit surface. In addition, a polarization conversion film may be located on a surface of the waveguide that is opposite the exit surface, where the polarization conversion film is configured to transform the polarization of at least some of the S-polarized light rays reflected by the at least one dichroic layer to P-polarized light rays, and to reflect the transformed P-polarized light rays back into the waveguide such that at least a portion of the transformed P-polarized light rays may exit the waveguide and pass though the at least one dichroic layer. Furthermore, in such exemplary embodiments, the display system may include a display panel for providing images for display to a viewer of the display system, and configured to receive the P-polarized light rays passing through the at least one dichroic layer.

In other aspects, methods for illuminating an electronic display system are provided by the disclosed principles. In one embodiment, such a method may comprise transmitting light rays into a waveguide comprising an exit surface having a critical angle above which light rays may exit the waveguide, wherein a portion of the transmitted light rays exit the waveguide through the exit surface. Such a method may further include passing exiting light rays having a first polarization towards a display panel, while reflecting exiting light rays having a second polarization, different than the first polarization, back into the waveguide through the exit surface. Moreover, such exemplary method may include transforming the polarization of at least some of the reflected light rays having the second polarization into light rays having the first polarization, and reflecting the transformed light rays back towards the exit surface such that at least a portion of the transformed light rays exit the waveguide. Then such methods may provide for passing at least some of the transformed light rays exiting the waveguide towards the display panel to illuminate the display panel.

In other embodiments, methods for illuminating an electronic display system may comprise generating light rays using at least one illumination unit located proximate an optical waveguide comprising an exit surface having a critical angle above which light rays may exit the waveguide. Then such methods may comprise transmitting the generated light rays into the waveguide, wherein a portion of the transmitted light rays exit the waveguide through the exit surface. In addition, such methods may then provide for passing exiting P-polarized light rays while reflecting exiting S-polarized light rays back into the waveguide through the exit surface. Then such methods may comprise transforming at least some of the reflected S-polarized light rays into P-polarized light rays, and reflecting the transformed P-polarized light rays back towards the exit surface such that at least a portion of the transformed P-polarized light rays exit the waveguide. Afterwards, such exemplary methods may provide for passing at least some of the transformed P-polarized light rays exiting the waveguide, and illuminating a display panel, configured to provide images for display to a viewer, with at least a portion of the passed P-polarized light rays and transformed P-polarized light rays.

Embodiments herein may provide an autostereoscopic display with large area and thin structure. Further, as will be described, the optical valves of the present disclosure may achieve thin optical components with large back working distances. Such components can be used in directional backlights, to provide directional displays including autostereoscopic displays. Further, embodiments may provide a controlled illuminator for the purposes of an efficient autostereoscopic display.

Embodiments of the present disclosure may be used in a variety of optical systems. The embodiment may include or work with a variety of projectors, projection systems, optical components, displays, microdisplays, computer systems, processors, self-contained projector systems, visual and/or audiovisual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

Directional backlights offer control over the illumination emanating from substantially the entire output surface controlled typically through modulation of independent LED light sources arranged at the input aperture side of an optical waveguide. Controlling the emitted light directional distribution can achieve single person viewing for a security function, where the display can only be seen by a single viewer from a limited range of angles; high electrical efficiency, where illumination is only provided over a small angular directional distribution; alternating left and right eye viewing for time sequential stereoscopic and autostereoscopic display; and low cost.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying figures, in which like reference numbers indicate similar parts, and in which:

FIG. 1A is a schematic diagram illustrating a front view of light propagation in one embodiment of an optical valve apparatus, in accordance with the present disclosure;

DETAILED DESCRIPTION

Figure 1B:
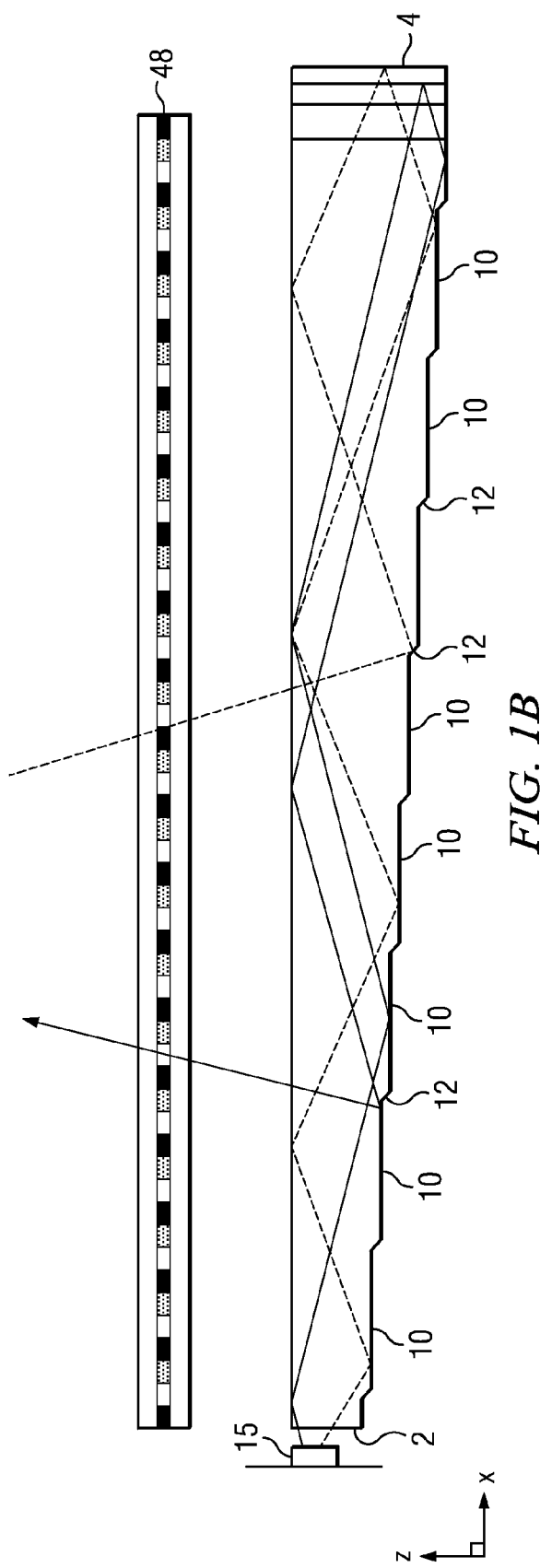
FIG. 1B is a schematic diagram illustrating a side view of light propagation in one embodiment of the optical valve apparatus of FIG. 1A, in accordance with the present disclosure.

Time multiplexed autostereoscopic displays can advantageously improve the spatial resolution of autostereoscopic display by directing light from all of the pixels of a spatial light modulator to a first viewing window in a first time slot, and all of the pixels to a second viewing window in a second time slot. Thus an observer with eyes arranged to receive light in first and second viewing windows will see a full resolution image across the whole of the display over multiple time slots. Time multiplexed displays can advantageously achieve directional illumination by directing an illuminator array through a substantially transparent time multiplexed spatial light modulator using directional optical elements, wherein the directional optical elements substantially form an image of the illuminator array in the window plane.

The uniformity of the viewing windows may be advantageously independent of the arrangement of pixels in the spatial light modulator. Advantageously, such displays can provide observer tracking displays which have low flicker, with low levels of cross talk for a moving observer.

To achieve high uniformity in the window plane, it is desirable to provide an array of illumination elements that have a high spatial uniformity. The illuminator elements of the time sequential illumination system may be provided, for example, by pixels of a spatial light modulator with size approximately 100 micrometers in combination with a lens array. However, such pixels suffer from similar difficulties as for spatially multiplexed displays. Further, such devices may have low efficiency and higher cost, requiring additional display components.

High window plane uniformity can be conveniently achieved with macroscopic illuminators, for example, an array of LEDs in combination with homogenizing and diffusing optical elements that are typically of size 1 mm or greater. However, the increased size of the illuminator elements means that the size of the directional optical elements increases proportionally. For example, a 16 mm wide illuminator imaged to a 65 mm wide viewing window may require a 200 mm back working distance. Thus, the increased thickness of the optical elements can prevent useful application, for example, to mobile displays, or large area displays.

Addressing the aforementioned shortcomings, optical valves as described in commonly-owned U.S. patent application Ser. No. 13/300,293 advantageously can be arranged in combination with fast switching transmissive spatial light modulators to achieve time multiplexed autostereoscopic illumination in a thin package while providing high resolution images with flicker free observer tracking and low levels of cross talk. Described is a one dimensional array of viewing positions, or windows, that can display different images in a first, typically horizontal, direction, but contain the same images when moving in a second, typically vertical, direction.

As used herein, an optical valve is an optical structure that may be a type of light guiding structure or device referred to as, for example, a light valve, an optical valve directional backlight, and a valve directional backlight ("v-DBL"). As used herein for discussion purposes only, and not of limitation, examples of an imaging directional backlight include a stepped imaging directional backlight, a folded imaging directional backlight, a wedge type directional backlight, an optical valve, or an optical inline directional backlight. Additionally, as used herein for discussion purposes only and not of limitation, a stepped imaging directional backlight may be at least one of an optical valve or an optical inline directional backlight. Moreover, as used herein for discussion purposes only and not of limitation, a folded imaging directional backlight may be at least one of a wedge type directional backlight, or an optical valve.

In operation, light may propagate within an exemplary optical valve in a first direction from an input side to a reflective side and may be transmitted substantially without loss. Light may be reflected at the reflective side and propagates in a second direction substantially opposite the first direction. As the light propagates in the second direction, the light may be incident on light extraction features, which are operable to redirect the light outside the optical valve. Stated differently, the optical valve generally allows light to propagate in the first direction and may allow light to be extracted while propagating in the second direction.

The optical valve may achieve time sequential directional illumination of large display areas. Additionally, optical elements may be employed that are thinner than the back working distance of the optical elements to direct light from macroscopic illuminators to a window plane. Such displays may use an array of light extraction features arranged to extract light counter propagating in a substantially parallel waveguide.

Thin directional backlight implementations for use with LCDs have been proposed and demonstrated by 3M, for example U.S. Pat. No. 7,528,893; by Microsoft, for example U.S. Pat. No. 7,970,246 which may be referred to herein as a "wedge type directional backlight;" by RealD, for example U.S. patent application Ser. No. 13/300,293 which may be referred to herein as an "optical valve" or "optical valve directional backlight," and by RealD, for example U.S. Patent Application No. 61/649,124, concurrently filed herewith, which may be referred to herein as an "optical inline directional backlight," all of which are herein incorporated by reference in their entirety. Edge lit waveguide backlight illumination structures may be used in liquid crystal display systems such as those seen in 2D laptops, monitors and TVs. Light propagates from the edge of a lossy waveguide which may include sparse features; typically local indentations in the surface of the guide which cause light to be lost regardless of the propagation direction of the light.

The present disclosure provides stepped imaging directional backlights in which light may reflect back and forth between the internal faces of, for example, a stepped waveguide which may include a first side and a first set of features. As the light travels along the length of the stepped waveguide, the light may not substantially change angle of incidence with respect to the first side and first set of surfaces and so may not reach the critical angle of the medium at these internal faces. Light extraction may be advantageously achieved by a second set of surfaces (the step "risers") that are inclined to the first set of surfaces (the step "treads"). Note that the second set of surfaces may not be part of the light guiding operation of the stepped waveguide, but may be arranged to provide light extraction from the structure. By contrast, a wedge type directional backlight may allow light to guide within a wedge profiled waveguide having continuous internal surfaces. The optical valve is thus not a wedge type directional backlight.

FIG. 1A is a schematic diagram illustrating a front view of light propagation in one embodiment of an optical valve structure, and FIG. 1B is a schematic diagram illustrating a side view of light propagation in the optical valve structure of FIG. 1A.

FIG. 1A illustrates a front view in the xy plane of an optical valve, and includes an illuminator array 15 which may be used to illuminate a stepped waveguide 1. Illuminator array 15 includes illuminator elements 15a through illuminator element 15n (where n is an integer greater than one). In one example, the stepped waveguide 1 of FIG. 1A may be a stepped, display sized waveguide 1. Illumination elements 15a through 15n may be light emitting diodes (LEDs). Although LEDs are discussed herein as illuminator elements 15a-15n, other light sources may be used such as, but not limited to, diode sources, semiconductor sources, laser sources, local field emission sources, organic emitter arrays, and so forth. Additionally, FIG. 1B illustrates a side view in the xz plane, and includes illuminator array 15, LCD 48, extraction features 12, guiding features 10, and stepped waveguide 1, arranged as shown. The side view provided in FIG. 1B is an alternative view of the front view shown in FIG. 1A. Accordingly, the illuminator array 15 of FIGS. 1A and 1B corresponds to one another and the stepped waveguide 1 of FIGS. 1A and 1B may correspond to one another. Further, in FIG. 1B, the stepped waveguide 1 may have a thin end 2 and a thick end 4. Although the LCD 48 may be referred to herein for discussion purposes, other spatial light modulators or displays may be used including LCOS, DLP devices, and so forth, as this illuminator may work in reflection.

The operation of an optical valve that may provide a one dimensional array of viewing windows is illustrated in front view in FIG. 1A, with its side profile shown in FIG. 1B. In operation, in FIGS. 1A and 1B, light may be emitted from an illuminator array 15, such as an array of illuminator elements 15a through 15n, located at different positions, y, along the surface of thin end side 2, x=0, of the stepped waveguide 1. The light may propagate along +x in a first direction, within the stepped waveguide 1, while at the same time, the light may fan out in the xy plane and upon reaching the far curved end side 4, may substantially or entirely fill the curved end side 4. While propagating, the light may spread out to a set of angles in the xz plane up to, but not exceeding the critical angle of the guide material. The extraction features 12 that link the guiding features 10 of the bottom side of the stepped waveguide 1 may have a tilt angle greater than the critical angle and hence may be missed by substantially all light propagating along +x in the first direction, ensuring the substantially lossless forward propagation.

Continuing the discussion of FIGS. 1A and 1B, the curved end side 4 of the stepped waveguide 1 may be made reflective, typically by being coated with a reflective material such as, for example, silver, although other reflective techniques may be employed. Light may therefore be redirected in a second direction, back down the guide in the direction of −x and may be substantially collimated in the xy or display plane. The angular spread may be substantially preserved in the xz plane about the principal propagation direction, which may allow light to hit the riser edges and reflect out of the guide. In an embodiment with approximately 45° tilted extraction features 12, light may be effectively directed approximately normal to the xy display plane with the xz angular spread substantially maintained relative to the propagation direction. This angular spread may be increased when light exits the stepped waveguide 1 through refraction, but may be decreased somewhat dependent on the reflective properties of the extraction features 12.

In some embodiments with uncoated extraction features 12, reflection may be reduced when total internal reflection (TIR) fails, squeezing the xy angular profile and shifting off normal. However, in other embodiments having silver coated or metallized extraction features, the increased angular spread and central normal direction may be preserved. Continuing the description of the embodiment with silver coated extraction features, in the xz plane, light may exit the stepped waveguide 1 approximately collimated and may be directed off normal in proportion to the y-position of the respective illuminator element 15a-15n in illuminator array 15 from the input edge center. Having independent illuminator elements 15a-15n along the input edge 2 then enables light to exit from the entire first light directing side 6 and propagate at different external angles, as illustrated in FIG. 1A.

Figure 2A:
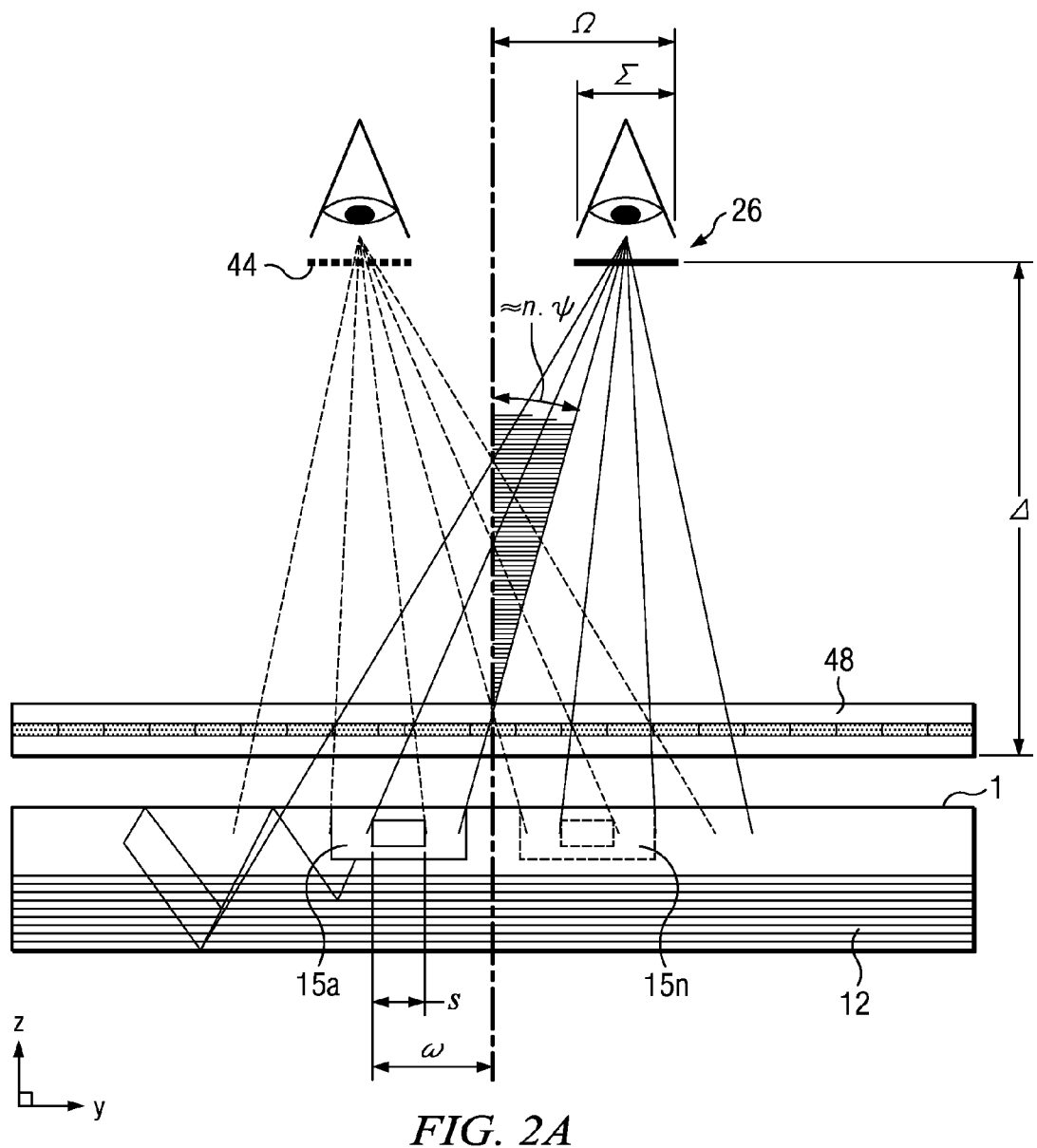
FIG. 2A is a schematic diagram illustrating in a top view of light propagation in another embodiment of an optical valve apparatus, in accordance with the present disclosure.
Figure 2B:
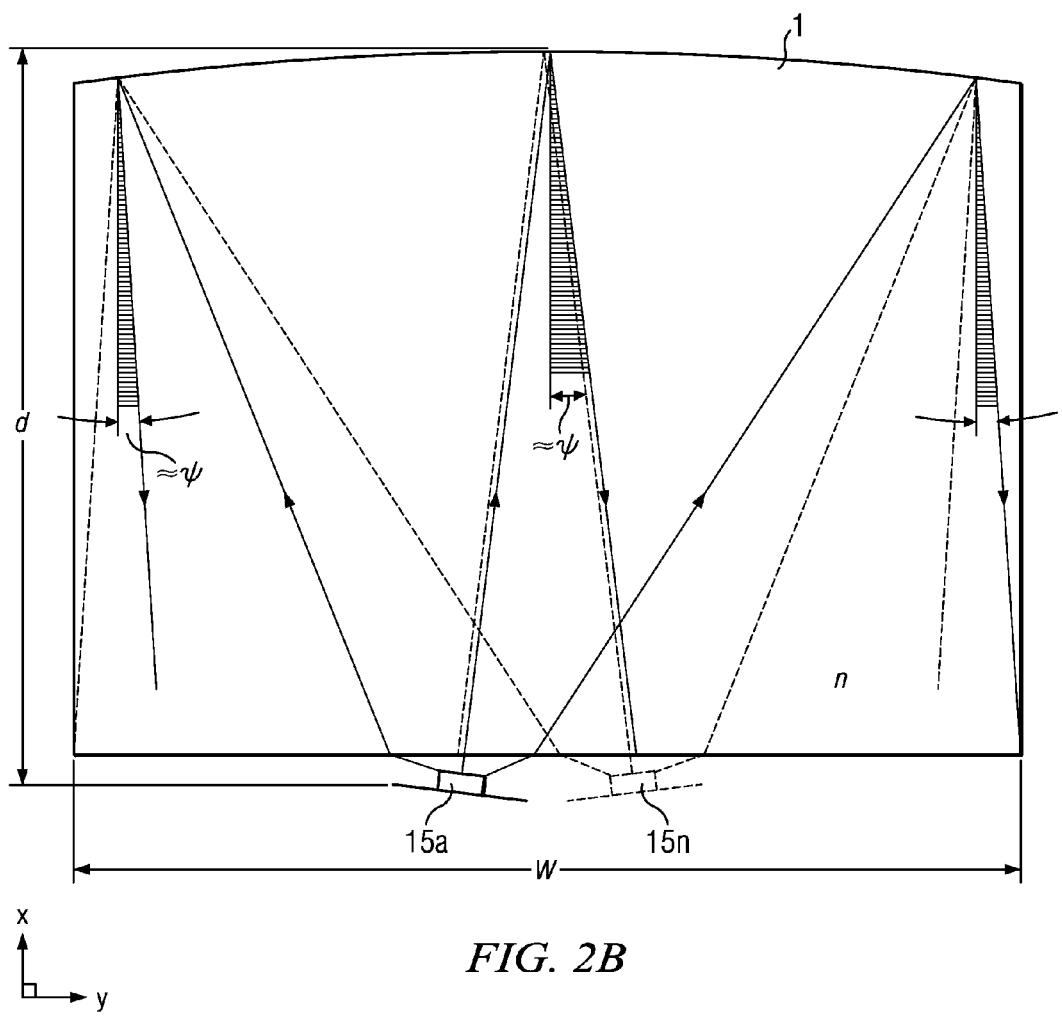
FIG. 2B is a schematic diagram illustrating light propagation in a front view of the optical valve apparatus of FIG. 2A, in accordance with the present disclosure.
Figure 2C:
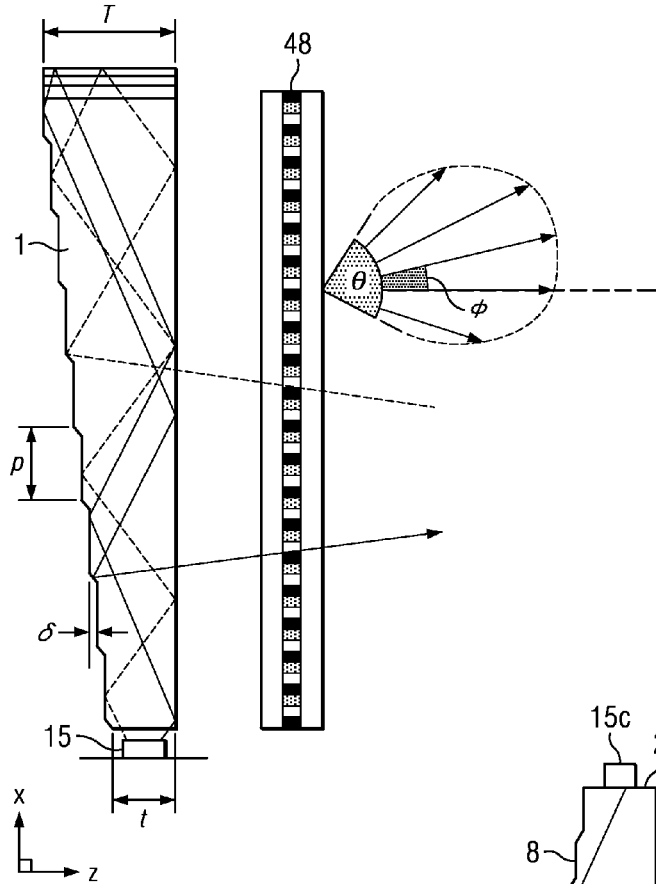
FIG. 2C is a schematic diagram illustrating light propagation in a side view of the optical valve apparatus of FIG. 2A, in accordance with the present disclosure.

Illuminating a spatial light modulator (SLM) 48 such as a fast liquid crystal display (LCD) panel with such a device may achieve autostereoscopic 3D as shown in top view or yz-plane viewed from the illuminator array 15 end in FIG. 2A, front view in FIG. 2B and side view in FIG. 2C. FIG. 2A is a schematic diagram illustrating in a top view, propagation of light in an optical valve system, FIG. 2B is a schematic diagram illustrating in a front view, propagation of light in an optical valve system, and FIG. 2C is a schematic diagram illustrating in side view propagation of light in an optical valve system. As illustrated in FIGS. 2A, 2B, and 2C, a stepped waveguide 1 may be located behind a fast (e.g., greater than 100 Hz) LCD panel SLM 48 that displays sequential right and left eye images. In synchronization, specific illuminator elements 15a through 15n of illuminator array 15 (where n is an integer greater than one) may be selectively turned on and off, providing illuminating light that enters right and left eyes substantially independently by virtue of the system's directionality. In the simplest case, sets of illuminator elements of illuminator array 15 are turned on together, providing a one dimensional viewing window 26 or an optical pupil with limited width in the horizontal direction, but extended in the vertical direction, in which both eyes horizontally separated may view a left eye image, and another viewing window 44 in which a right eye image may primarily be viewed by both eyes, and a central position in which both the eyes may view different images. In this way, 3D may be viewed when the head of a viewer is approximately centrally aligned. Movement to the side away from the central position may result in the scene collapsing onto a 2D image.

Figure 3:
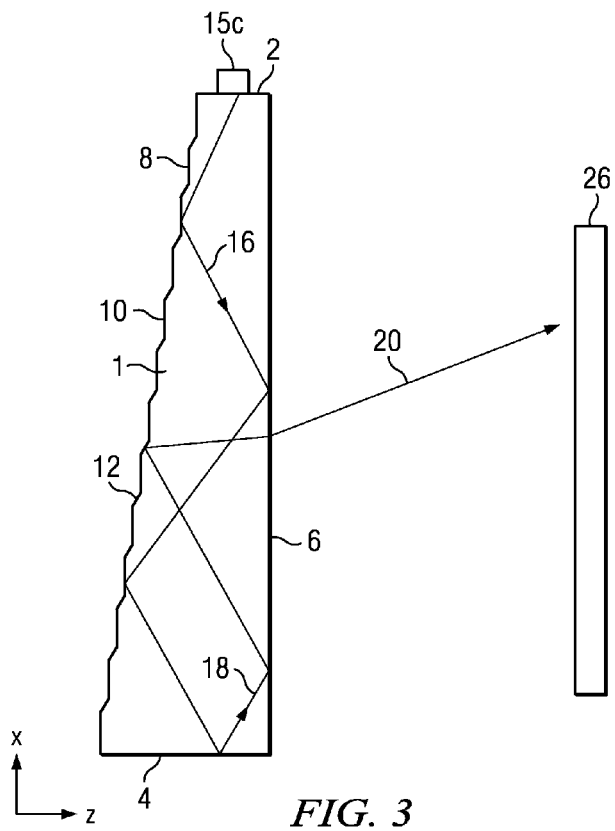
FIG. 3 is a schematic diagram illustrating in a side view of an optical valve apparatus, in accordance with the present disclosure.

FIG. 3 is a schematic diagram illustrating in side view an optical valve. Further, FIG. 3 illustrates additional detail of a side view of the operation of a stepped waveguide 1, which may be a transparent material. The stepped waveguide 1 may include an illuminator input side 2, a reflective side 4, a first light directing side 6 which may be substantially planar, and a second light directing side 8 which includes guiding features 10 and light extraction features 12. In operation, light rays 16 from an illuminator element 15c of an illuminator array 15 (not shown in FIG. 3), that may be an addressable array of LEDs for example, may be guided in the stepped waveguide 1 by means of total internal reflection by the first light directing side 6 and total internal reflection by the guiding feature 10, to the reflective side 4, which may be a mirrored surface. Although reflective side 4 may be a mirrored surface and may reflect light, it may in some embodiments also be possible for light to pass through reflective side 4.

Continuing the discussion of FIG. 3, light ray 18 reflected by the reflective side 4 may be further guided in the stepped waveguide 1 by total internal reflection at the reflective side 4 and may be reflected by extraction features 12. Light rays 18 that are incident on extraction features 12 may be substantially deflected away from guiding modes of the stepped waveguide 1 and may be directed, as shown by ray 20, through the side 6 to an optical pupil that may form a viewing window 26 of an autostereoscopic display. The width of the viewing window 26 may be determined by at least the size of the illuminator, output design distance and optical power in the side 4 and extraction features 12. The height of the viewing window may be primarily determined by the reflection cone angle of the extraction features 12 and the illumination cone angle input at the input side 2.

Figure 4A:
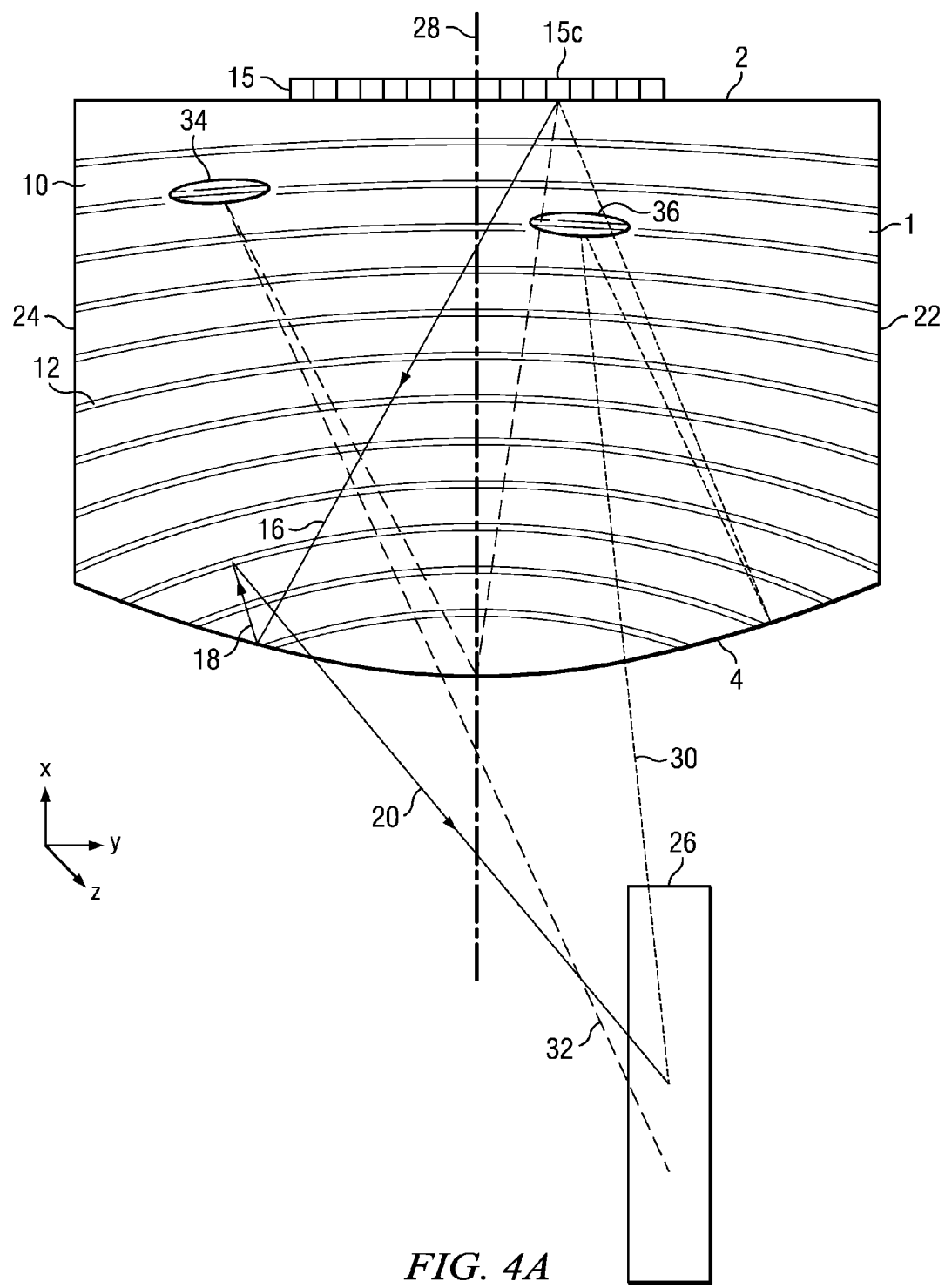
FIG. 4A is schematic diagram illustrating in a front view, generation of a viewing window in an optical valve apparatus and including curved light extraction features, in accordance with the present disclosure.

FIG. 4A is a schematic diagram illustrating in front view an optical valve which may be illuminated by a first illuminator element and including curved light extraction features. Further, FIG. 4A shows in front view further guiding of light rays from illuminator element 15c of illuminator array 15, in the stepped waveguide 1. Each of the output rays are directed towards the same viewing window 26 from the respective illuminator 14. Thus light ray 30 may intersect the ray 20 in the window 26, or may have a different height in the window as shown by ray 32. Additionally, in various embodiments, sides 22, 24 of the optical valve may be transparent, mirrored, or blackened surfaces. Continuing the discussion of FIG. 4A, light extraction features 12 may be elongate, and the orientation of light extraction features 12 in a first region 34 of the light directing side 8 (light directing side 8 shown in FIG. 3, but not shown in FIG. 4A) may be different to the orientation of light extraction features 12 in a second region 36 of the light directing side 8.

Figure 4B:
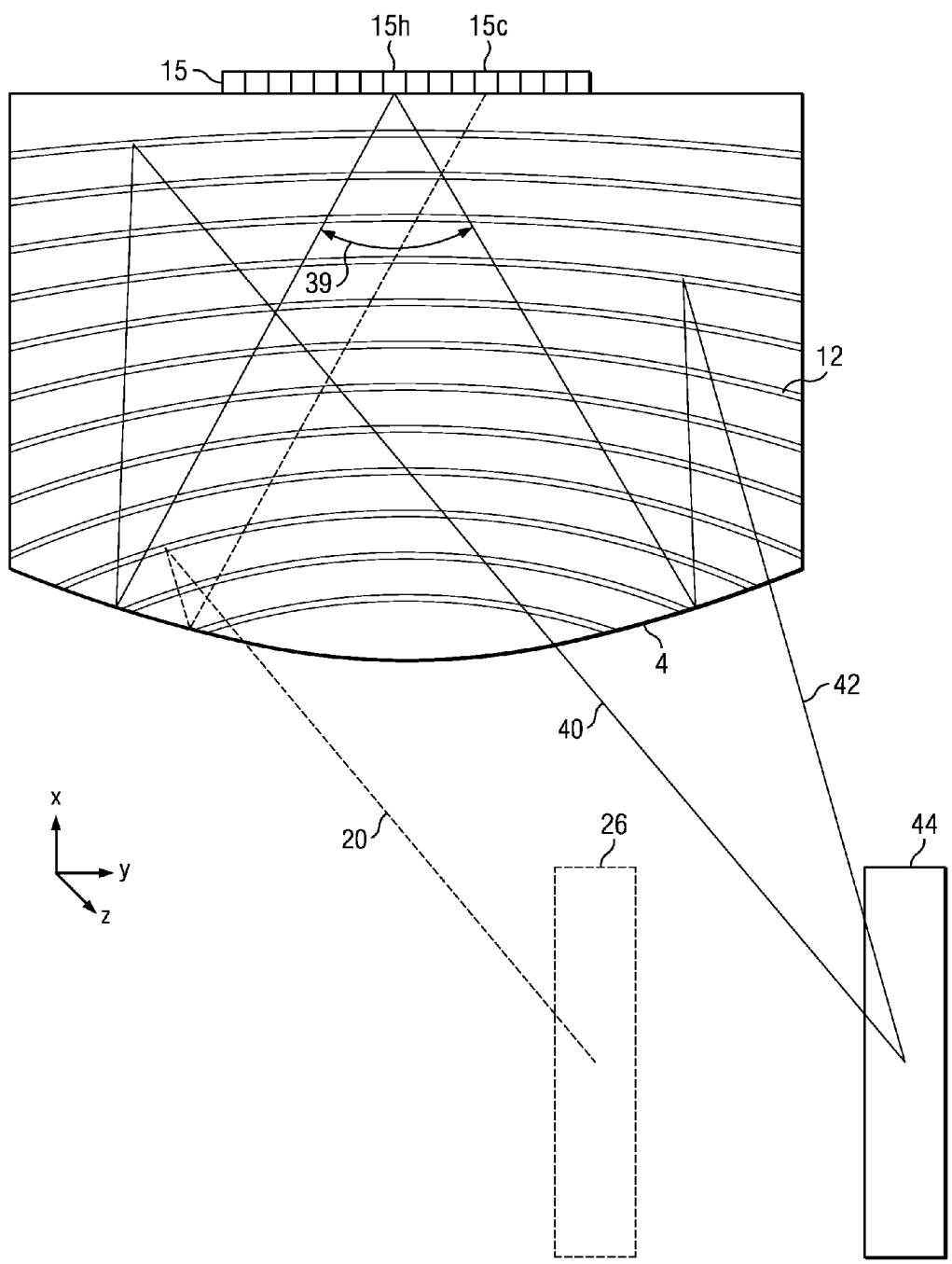
FIG. 4B is a schematic diagram illustrating in a front view, generation of a first and a second viewing window in an optical valve apparatus and including curved light extraction features, in accordance with the present disclosure.

FIG. 4B is a schematic diagram illustrating in front view an optical valve which may illuminated by a second illuminator element. Further, FIG. 4B shows the light rays 40, 42 from a second illuminator element 15h of the illuminator array 15. The curvature of the reflective surface on the side 4 and the light extraction features 12 cooperatively produce a second viewing window 44 laterally separated from the viewing window 26 with light rays from the illuminator element 15h.

Advantageously, the arrangement illustrated in FIG. 4B may provide a real image of the illuminator element 15c at a viewing window 26 in which the real image may be formed by cooperation of optical power in reflective side 4 and optical power which may arise from different orientations of elongate light extraction features 12 between regions 34 and 36, as shown in FIG. 4A. The arrangement of FIG. 4B may achieve improved aberrations of the imaging of illuminator element 15c to lateral positions in viewing window 26. Improved aberrations may achieve an extended viewing freedom for an autostereoscopic display while achieving low cross talk levels.

Figure 5:
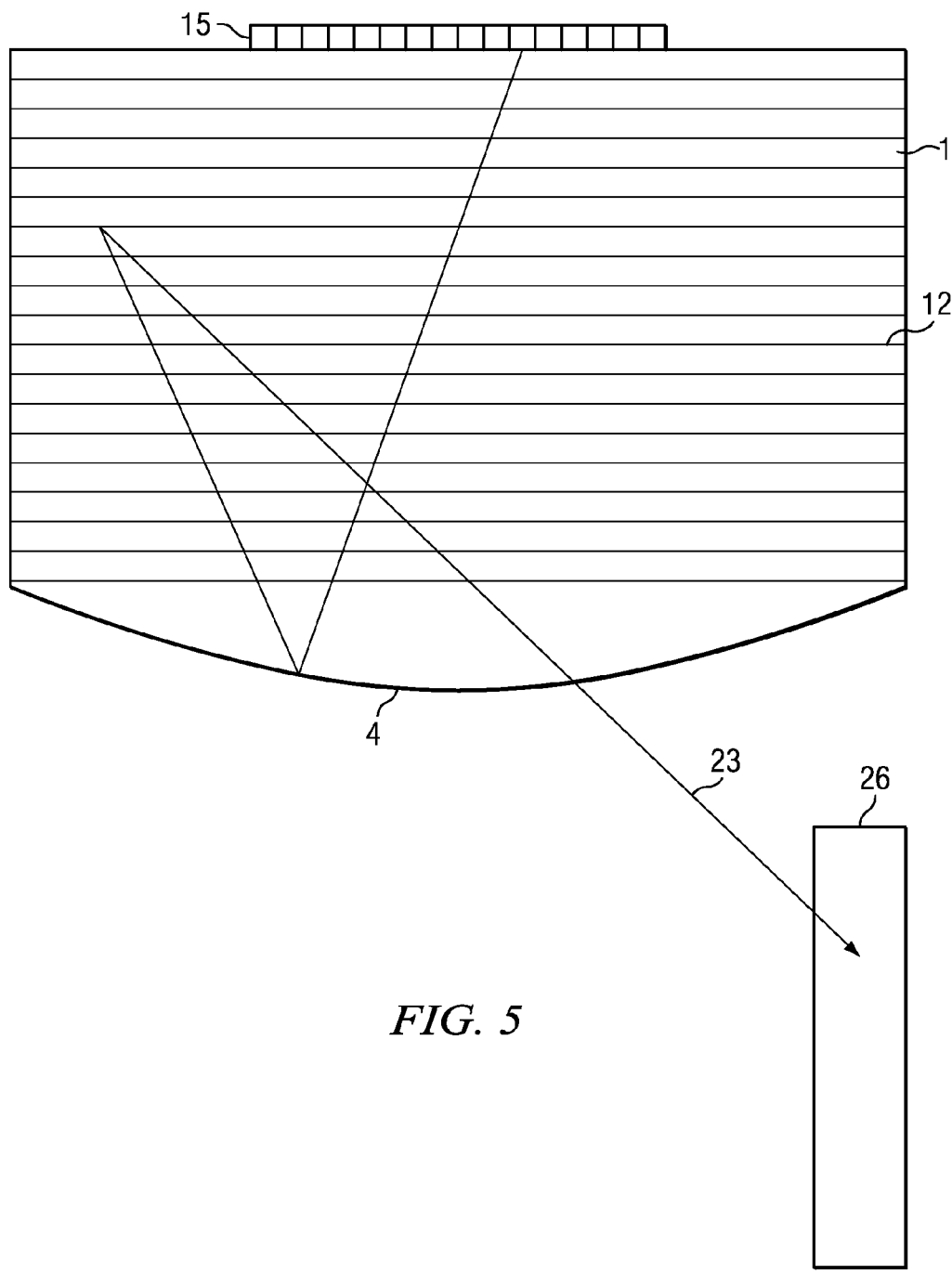
FIG. 5 is a schematic diagram illustrating generation of a first viewing window in an optical valve apparatus including linear light extraction features, in accordance with the present disclosure.

FIG. 5 is a schematic diagram illustrating in front view an embodiment of an optical valve having substantially linear light extraction features 12. Further, FIG. 5 shows a similar arrangement of components to FIG. 1 (with corresponding elements being similar), with one of the differences being that the light extraction features 12 are substantially linear and parallel to each other. Advantageously, such an arrangement may provide substantially uniform illumination across a display surface, such as that illustrated by ray 23, and may be more convenient to manufacture than the curved extraction features of FIG. 4A and FIG. 4B.

Figure 6A:
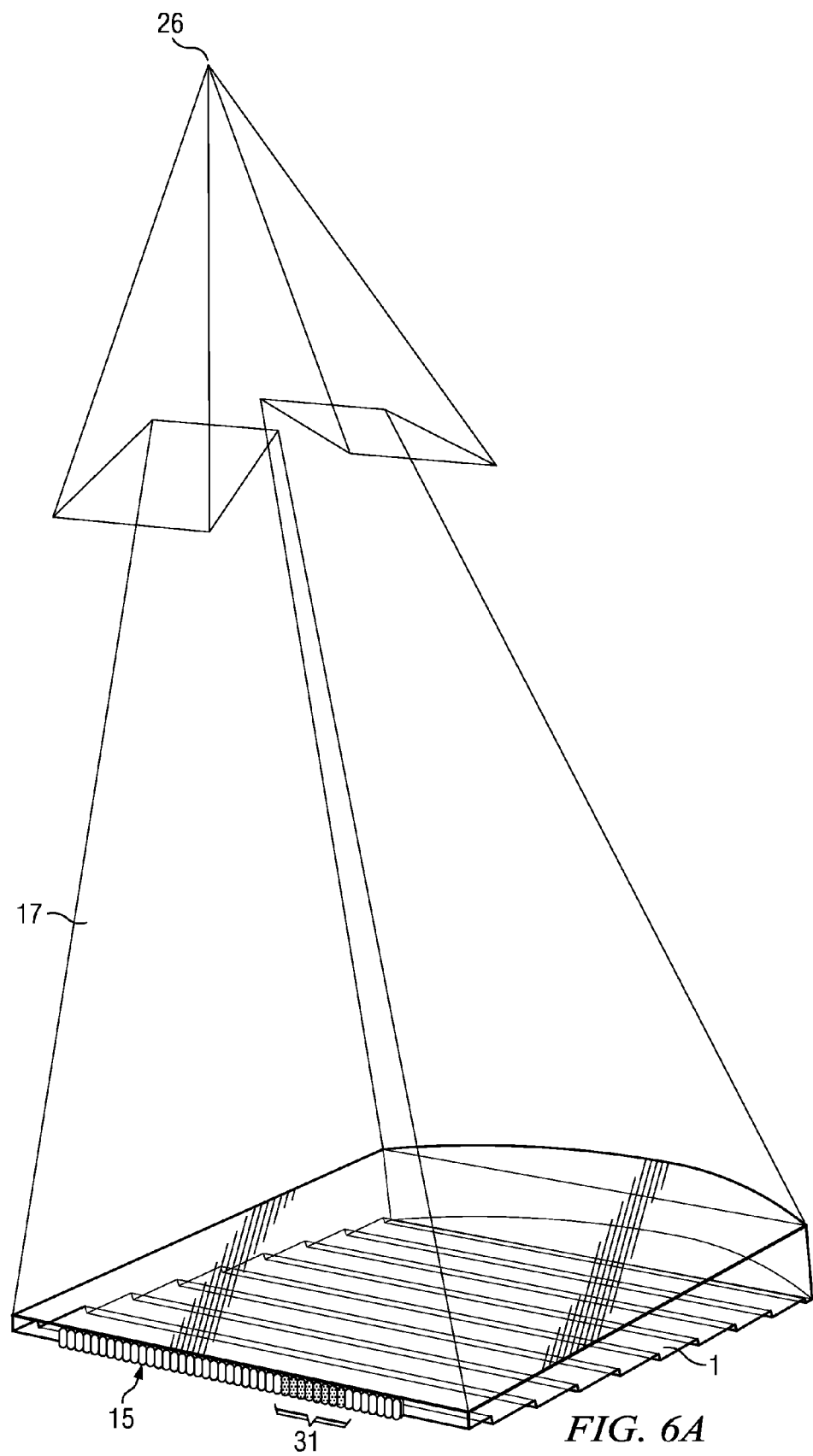
FIG. 6A is a schematic diagram illustrating one embodiment of the generation of a first viewing window in a time multiplexed imaging directional backlight apparatus, in accordance with the present disclosure.
Figure 6B:
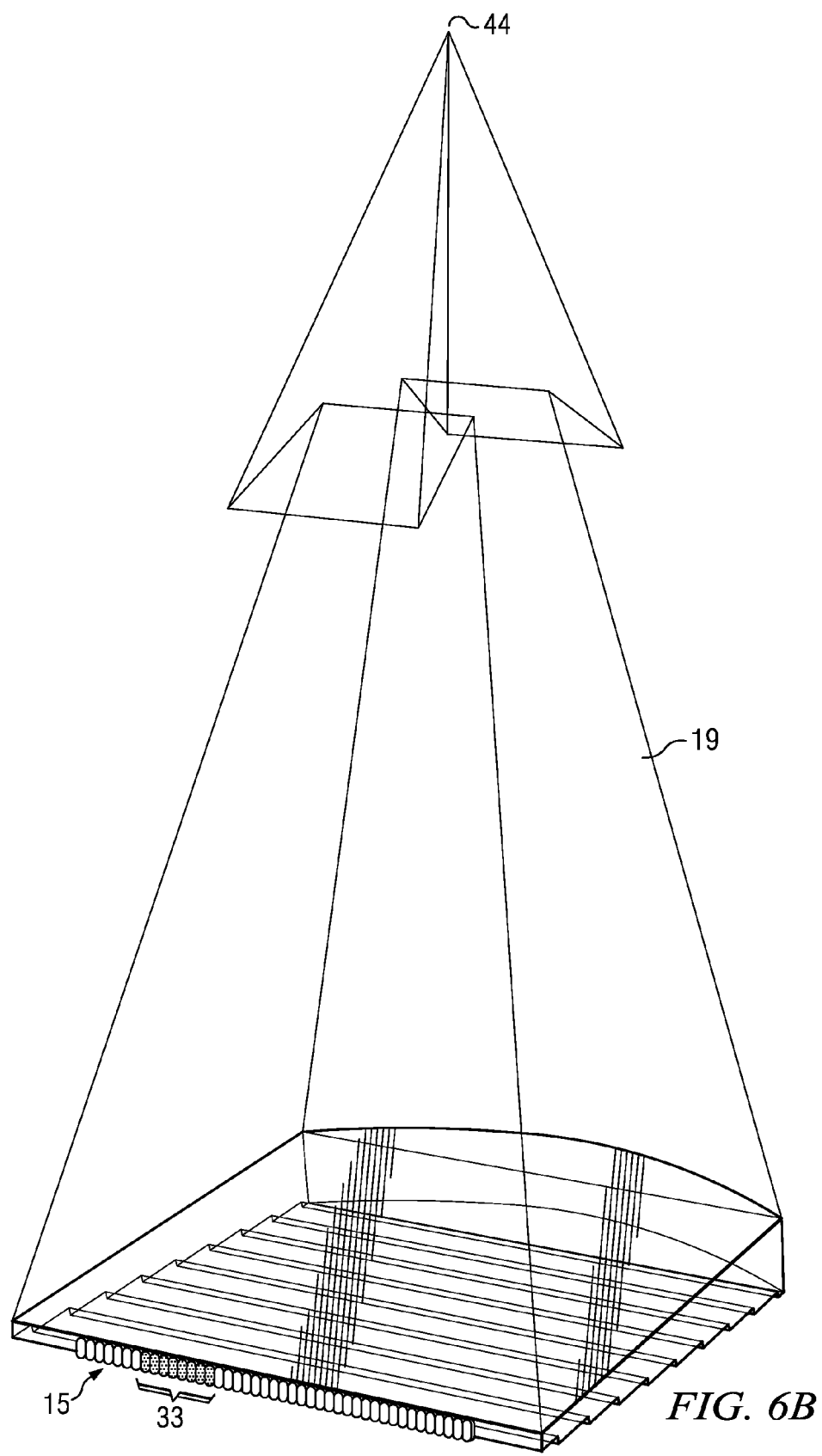
FIG. 6B is a schematic diagram illustrating another embodiment of the generation of a second viewing window in a time multiplexed optical valve apparatus in a second time slot, in accordance with the present disclosure.
Figure 6C:
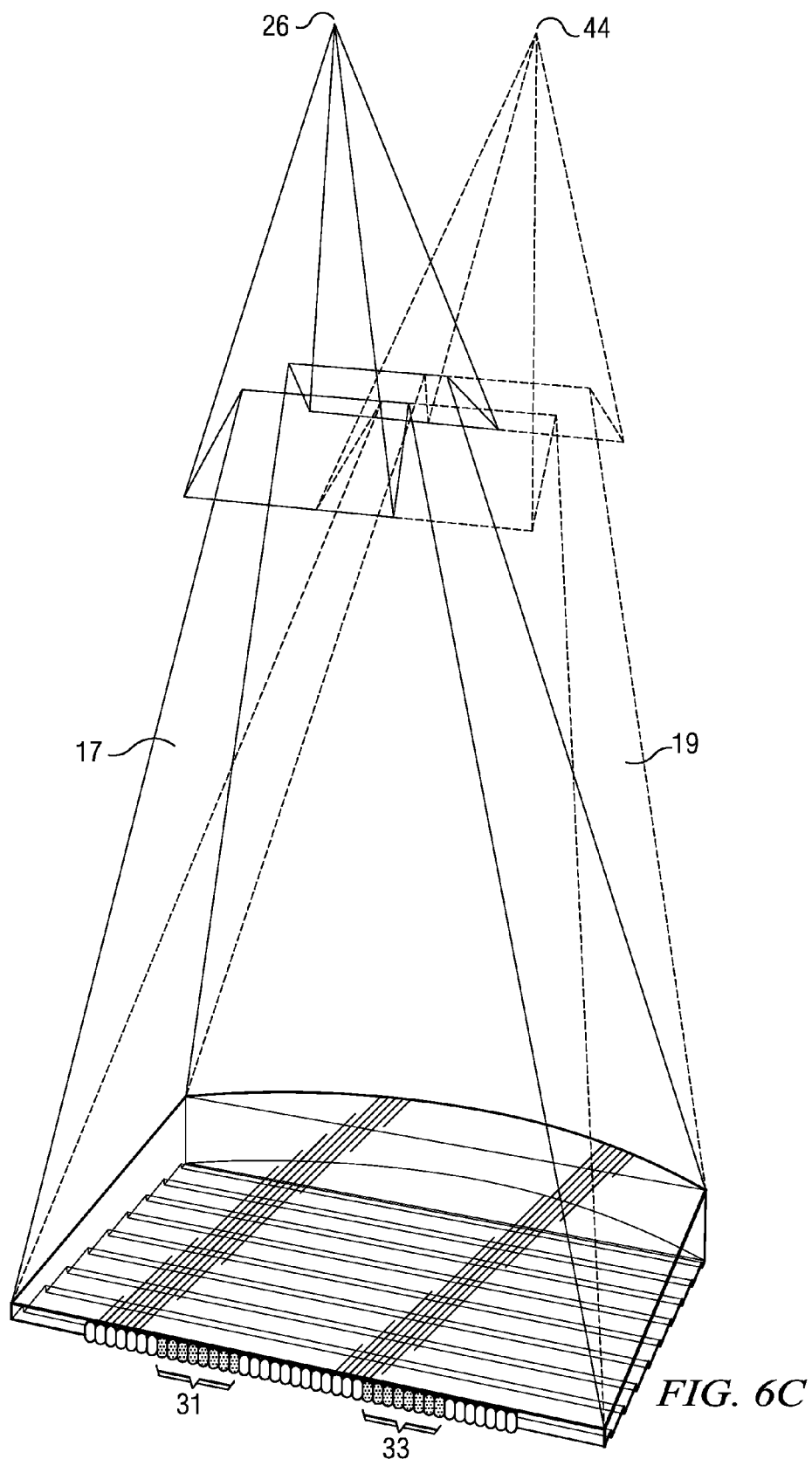
FIG. 6C is a schematic diagram illustrating another embodiment of the generation of a first and a second viewing window in a time multiplexed optical valve apparatus, in accordance with the present disclosure.

FIG. 6A is a schematic diagram illustrating one embodiment of the generation of a first viewing window in a time multiplexed imaging directional backlight apparatus, namely an optical valve apparatus in a first time slot, FIG. 6B is a schematic diagram illustrating another embodiment of the generation of a second viewing window in a time multiplexed imaging directional backlight apparatus in a second time slot, and FIG. 6C is a schematic diagram illustrating another embodiment of the generation of a first and a second viewing window in a time multiplexed imaging directional backlight apparatus. Further, FIG. 6A shows schematically the generation of illumination window 26 from stepped waveguide 1. Illuminator elements 31 in illuminator array 15 may provide a light cone 17 directed towards a viewing window 26. FIG. 6B shows schematically the generation of illumination window 44. Illuminator elements 33 in illuminator array 15 may provide a light cone 19 directed towards viewing window 44. In cooperation with a time multiplexed display, windows 26 and 44 may be provided in sequence as shown in FIG. 6C. If the image on a spatial light modulator 48 (not shown in FIGS. 6A, 6B, 6C) is adjusted in correspondence with the light direction output, then an autostereoscopic image may be achieved for a suitably placed viewer. Similar operation can be achieved with all imaging optical valve systems or imaging directional backlights.

Figure 7:
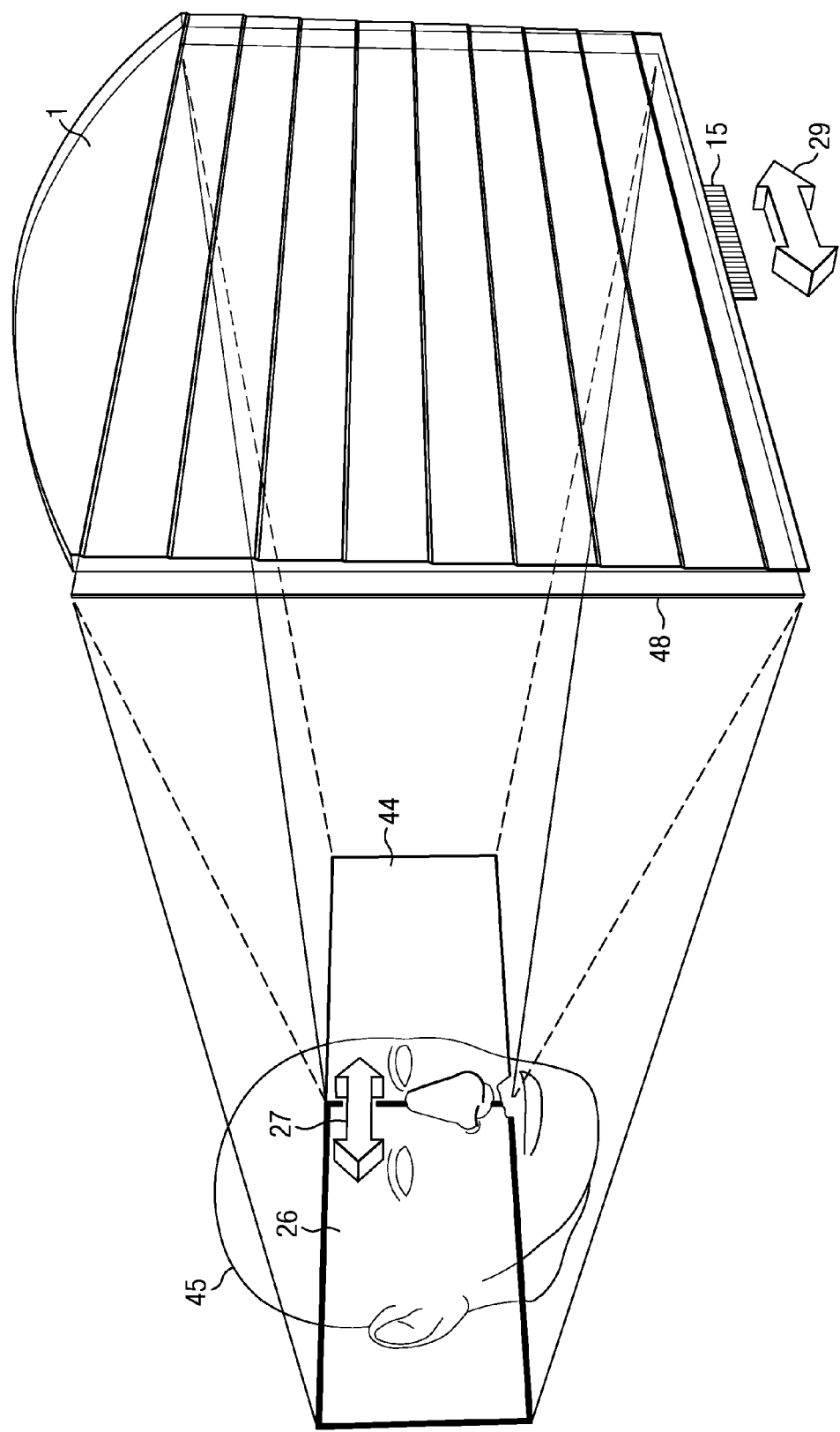
FIG. 7 is a schematic diagram illustrating an observer tracking autostereoscopic display apparatus including a time multiplexed optical valve apparatus, in accordance with the present disclosure.

FIG. 7 is a schematic diagram illustrating one embodiment of an observer tracking autostereoscopic display apparatus including a time multiplexed optical valve apparatus. As shown in FIG. 7, selectively turning on and off illuminator elements along axis 29 provides for directional control of viewing windows 26 and 44. The lateral movement 27 of head 45 position may be monitored with a camera, motion sensor, motion detector, or any other appropriate optical, mechanical or electrical means, and the appropriate illuminator elements of illuminator array 15 may be turned on and off to provide substantially independent images on a spatial light modulator 48 to each eye irrespective of the head 45 position. The head tracking system (or a second head tracking system) may provide monitoring of more than one head 45, 47 (head 47 not shown in FIG. 7) and may supply the same left and right eye images to each viewers' left and right eyes providing 3D to all viewers. Again similar operation can be achieved with all imaging optical valve systems or imaging directional backlights.

Figure 8:
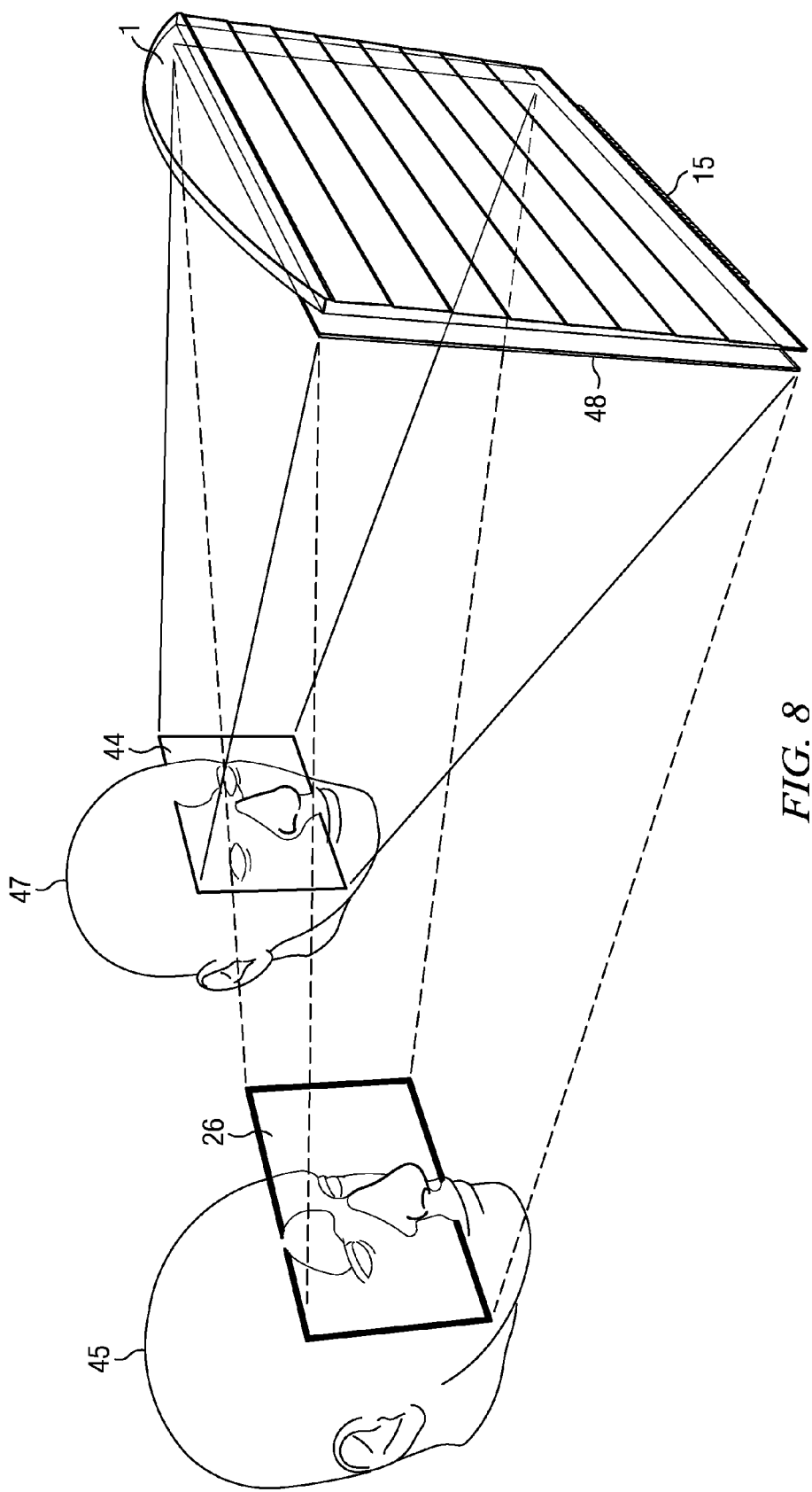
FIG. 8 is a schematic diagram illustrating a multi-viewer display apparatus including a time multiplexed optical valve apparatus, in accordance with the present disclosure.

FIG. 8 is a schematic diagram illustrating one embodiment of a multi-viewer display apparatus which includes a time multiplexed optical valve apparatus as an example of an imaging directional backlight. As shown in FIG. 8, at least two 2D images may be directed towards a pair of viewers 45, 47 so that each viewer may watch a different image on the spatial light modulator 48. The two 2D images of FIG. 8 may be generated in a similar manner as described with respect to FIG. 7 in that the two images would be displayed in sequence and in synchronization with sources whose light is directed toward the two viewers. One image is presented on the spatial light modulator 48 in a first phase, and a second image is presented on the spatial light modulator 48 in a second phase different from the first phase. In correspondence with the first and second phases, the output illumination is adjusted to provide first and second viewing windows 26, 44 respectively. An observer with both eyes in window 26 will perceive a first image while an observer with both eyes in window 44 will perceive a second image.

Figure 9:
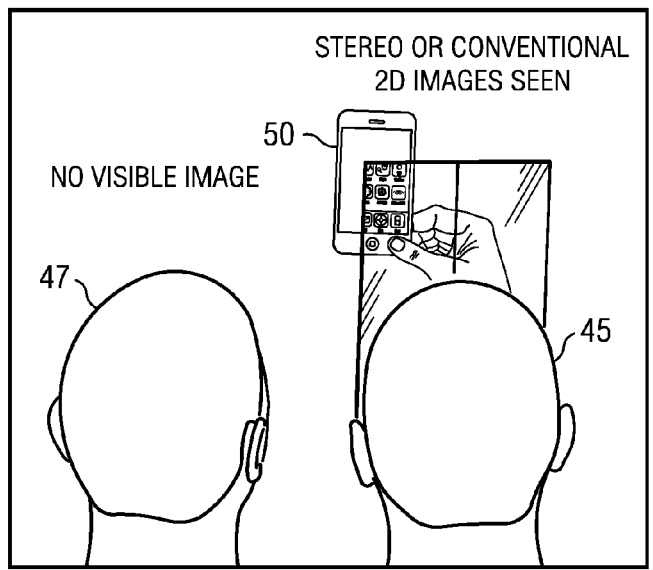
FIG. 9 is a schematic diagram illustrating a privacy display apparatus including an optical valve apparatus, in accordance with the present disclosure.

FIG. 9 is a schematic diagram illustrating a privacy display apparatus which includes an imaging directional backlight apparatus, and as illustrated, an optical valve. 2D display systems may also utilize directional backlighting for security and efficiency purposes in which light may be primarily directed at the eyes of a first viewer 45 as shown in FIG. 9. Further, as illustrated in FIG. 9, although first viewer 45 may be able to view an image on device 50, light is not directed towards second viewer 47. Thus second viewer 47 is prevented from viewing an image on device 50. Each of the embodiments of the present disclosure may advantageously provide autostereoscopic, dual image or privacy display functions.

Figure 10:
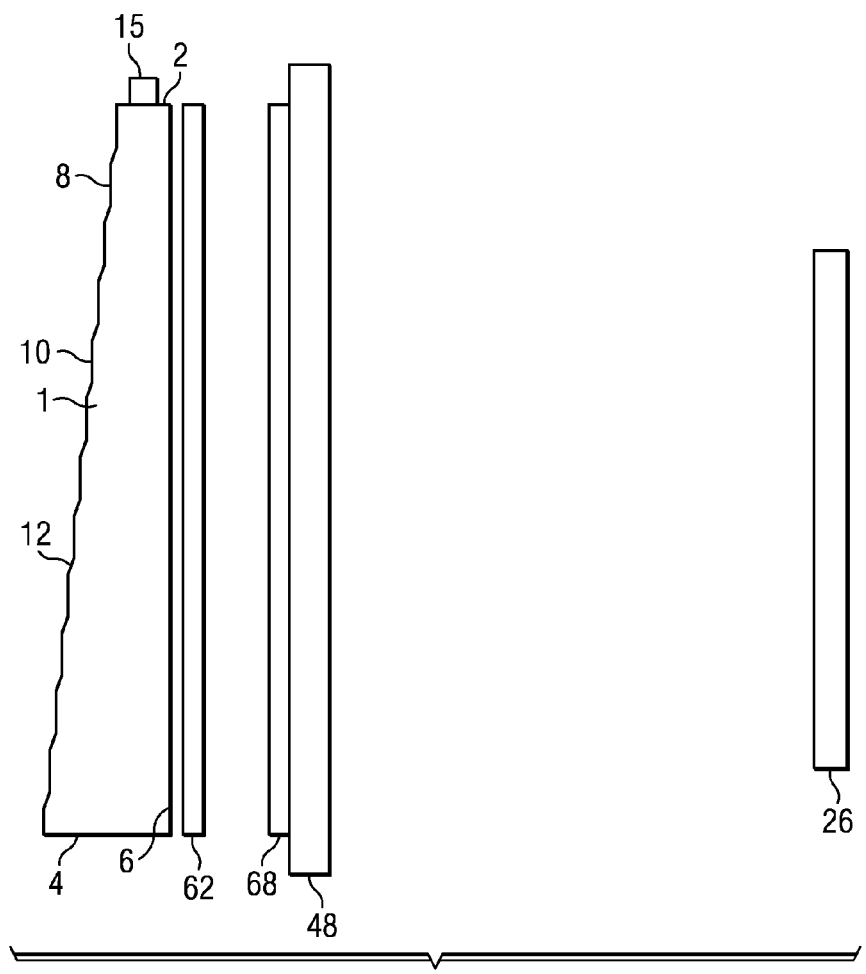
FIG. 10 is a schematic diagram illustrating in side view, the structure of a time multiplexed optical valve apparatus, in accordance with the present disclosure.

FIG. 10 is a schematic diagram illustrating in side view the structure of a time multiplexed optical valve apparatus as an example of an imaging directional backlight. Further, FIG. 10 shows in side view an autostereoscopic display, which may include the stepped waveguide 1 and a Fresnel lens 62 arranged to provide the viewing window 26 for a substantially collimated output across the stepped waveguide 1 output surface 6. A vertical diffuser 68 may be arranged to extend the height of the window 26 further. The light may then be imaged through the spatial light modulator 48. The illuminator array 15 may include light emitting diodes (LEDs) that may, for example, be phosphor converted blue LEDs, or may be separate RGB LEDs. Alternatively, the illuminator elements in illuminator array 15 may include a uniform light source and spatial light modulator arranged to provide separate illumination regions. Alternatively the illuminator elements may include laser light source(s). The laser output may be directed onto a diffuser by means of scanning, for example, using a galvo or MEMS scanner. In one example, laser light may thus be used to provide the appropriate illuminator elements in illuminator array 15 to advantageously provide a substantially uniform light source with the appropriate output angle, and further to provide reduction in speckle. Alternatively, the illuminator array 15 may be an array of laser light emitting elements. Additionally in one example, the diffuser 68 may be a wavelength converting phosphor, so that illumination may be at a different wavelength to the visible output light.

Figure 11A:
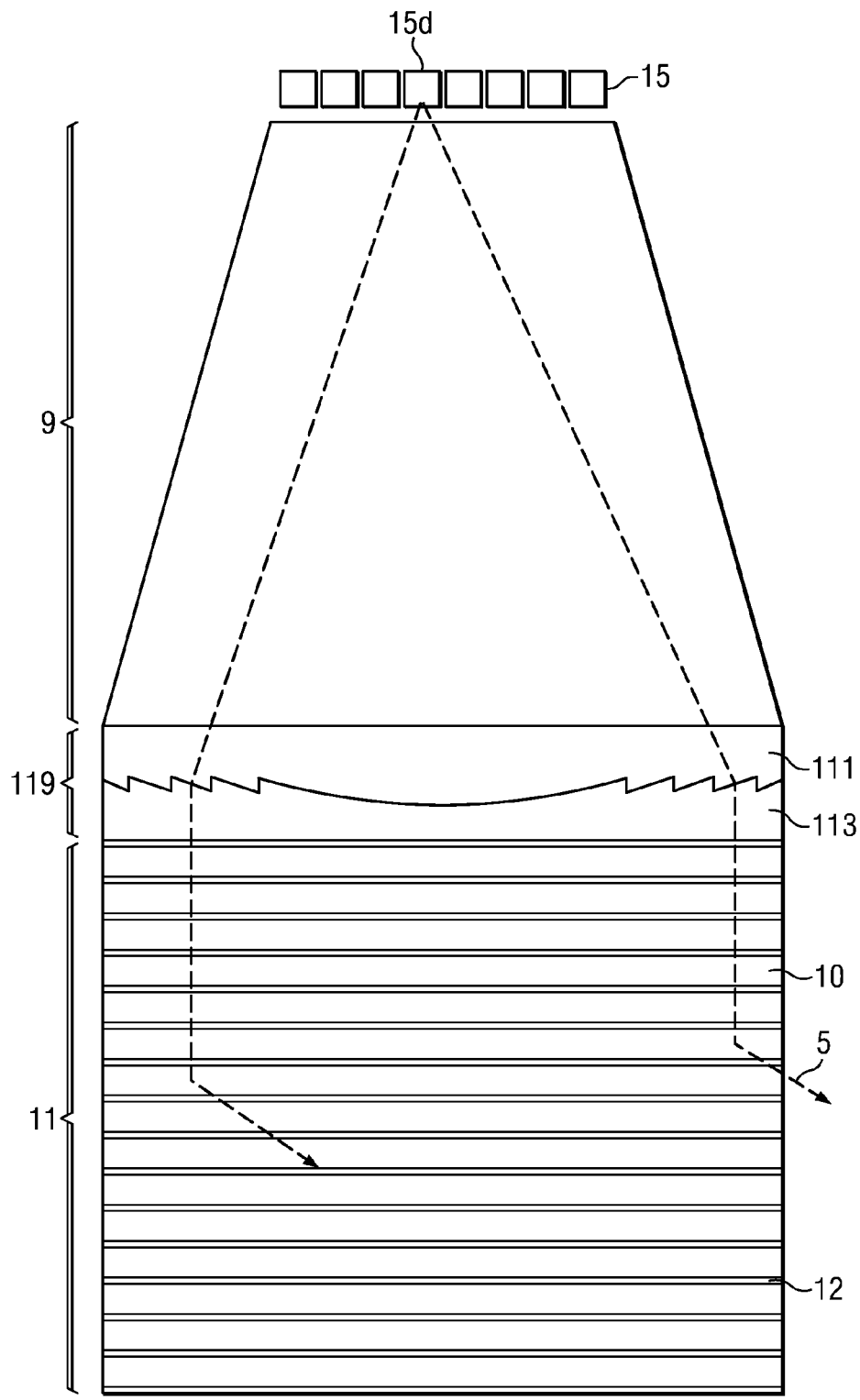
FIG. 11A is a schematic diagram illustrating a front view of an optical inline directional backlight apparatus as another example of an imaging directional backlight apparatus, in accordance with the present disclosure.

FIG. 11A is a schematic diagram illustrating a front view of an optical inline directional backlight apparatus as another example of an imaging directional backlight apparatus. Further, FIG. 11A shows another imaging directional backlight apparatus described herein as an optical inline directional backlight. The optical inline directional backlight may operate in a similar manner to the optical valve, with the difference that light may not be reversed at the end interface. Instead, the optical inline directional backlight may allow light to fan out in a guiding region before refracting light approximately half way down its length into a region containing extraction features 12 and in which light may be directed out of the guide and toward a viewer. Light emitted from an illuminator element 15d (e.g., LED) may expand within a guiding region 9 before being redirected with a refractive imaging element 119, which may include in this case, a Fresnel lens surface between dissimilar refractive index materials 111 and 113. Extraction features 12 may extract the light between guiding regions 10 to provide directed rays 5, which may converge to form viewing windows in a similar manner to the optical valve. Effectively, the optical inline directional backlight can be constructed and may operate as an unfolded optical valve in which the reflecting mirror 4 may be replaced by the refractive cylindrical lens 119.

Figure 11B:
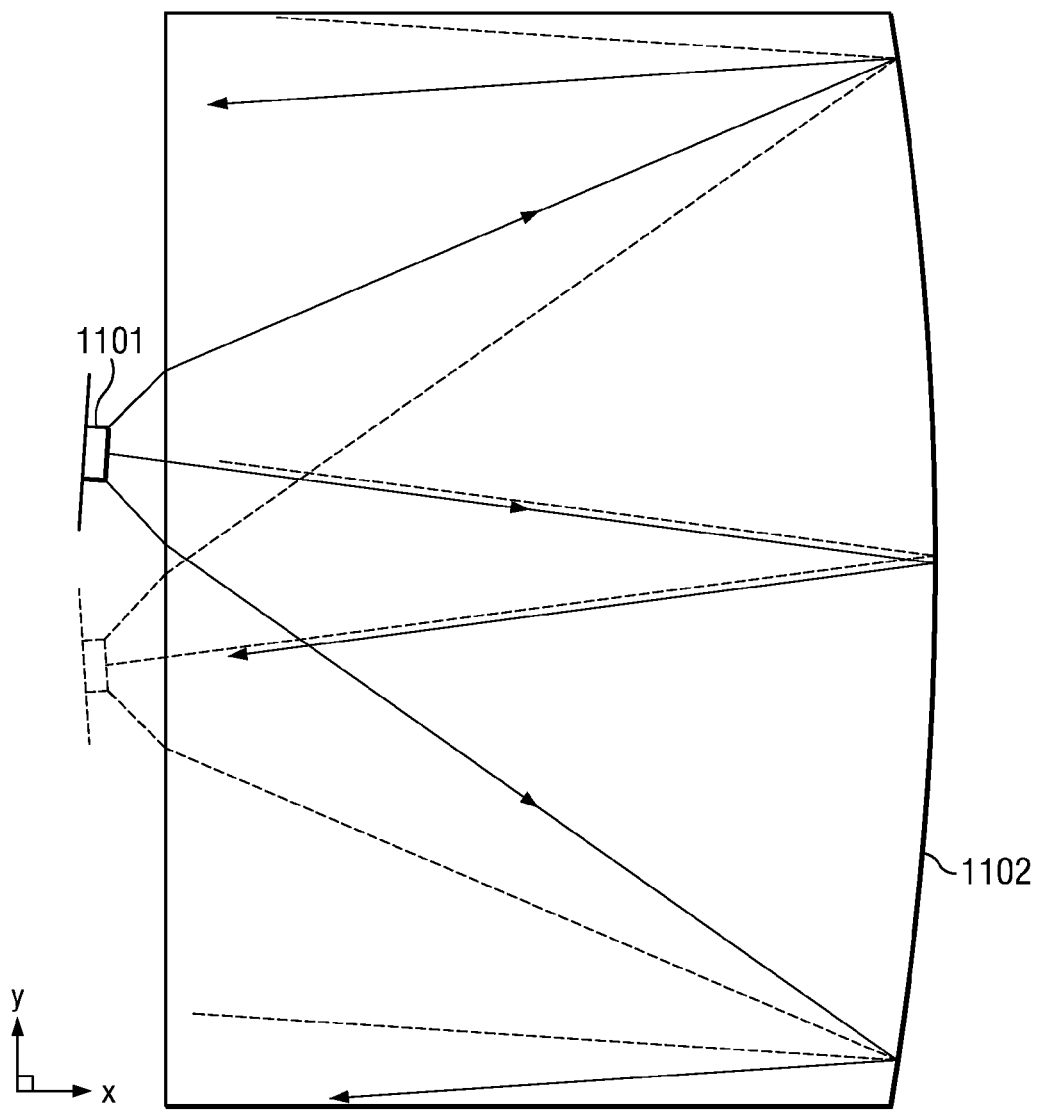
FIG. 11B is a schematic diagram illustrating a front view of a wedge type directional backlight apparatus, in accordance with the present disclosure.
Figure 11C:
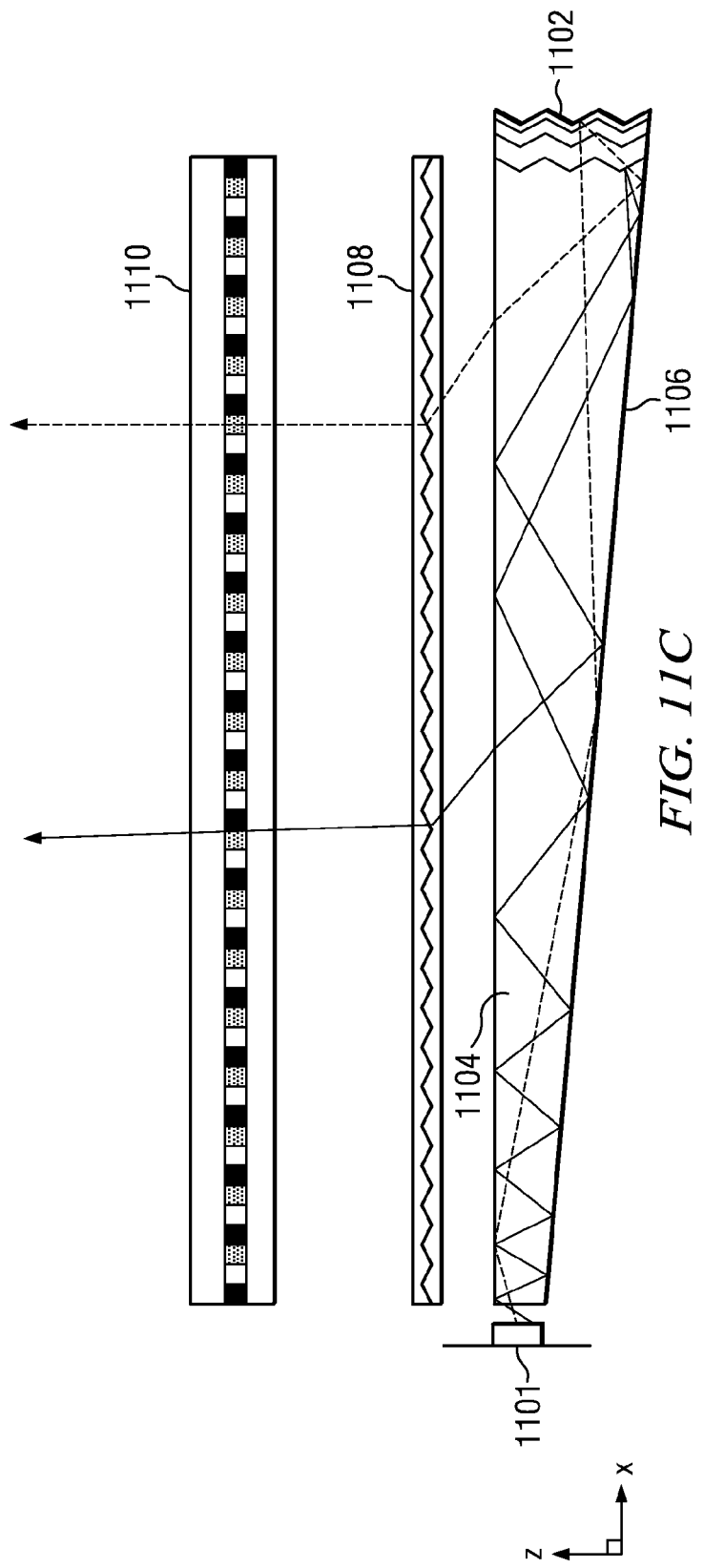
FIG. 11C is a schematic diagram illustrating a side view of a wedge type directional backlight apparatus, in accordance with the present disclosure.

FIG. 11B is a schematic diagram illustrating a front view of another imaging directional backlight apparatus, as illustrated, a wedge type directional backlight, and FIG. 11C is a schematic diagram illustrating a side view of the same wedge type directional backlight apparatus. A wedge type directional backlight is generally discussed by U.S. Pat. No. 7,660,047 and entitled "Flat Panel Lens," which is herein incorporated by reference in its entirety. The structure may include a wedge type waveguide 1104 with a bottom surface which may be preferentially coated with a reflecting layer 1106 and with an end corrugated surface 1102, which may also be preferentially coated with a reflecting material such as the kind used for reflecting layer 1106. As shown in FIG. 11C, light may enter the wedge type waveguide 1104 from local sources 1101 and the light may propagate in a first direction before reflecting off the end surface 1102. Light may exit the wedge type waveguide 1104 while on its return path and may illuminate a display panel 1110. By way of comparison with an optical valve, a wedge type waveguide provides extraction by a taper that reduces the incidence angle of propagating light so that when the light is incident at the critical angle on an output surface, it may escape. Escaping light at the critical angle in the wedge type waveguide propagates substantially parallel to the surface until extracted by a redirection layer 1108 such as a prism array. Errors or dust on the wedge type waveguide output surface may change the critical angle, creating stray light and uniformity errors. Further, an imaging directional backlight that uses a mirror to fold the beam path in the wedge type directional backlight may employ a faceted mirror that biases the light cone directions in the wedge type waveguide. Such faceted mirrors are generally complex to fabricate and may result in illumination uniformity errors as well as stray light.

The wedge type directional backlight and optical valve further process light beams in different ways. In the wedge type waveguide, light input at an appropriate angle will output at a defined position on a major surface, but light rays will exit at substantially the same angle and substantially parallel to the major surface. By comparison, light input to a stepped waveguide of an optical valve at a certain angle may output from points across the first side, with output angle determined by input angle. Advantageously, the stepped waveguide of the optical valve may not require further light re-direction films to extract light towards an observer and angular non-uniformities of input may not provide non-uniformities across the display surface.

Generally, one embodiment in accordance with the present disclosure may take the form of adding a dichroic layer stack and a polarization rotation film respectively to the exiting and reflecting surfaces of a wedge type directional backlight which performs efficient polarization conversion without compromising directional performance. Useful polarized illumination output may be increased by approximately 80%.

It should be noted that embodiments of the present disclosure may be used in a variety of optical systems and projection systems. The embodiment may include or work with a variety of projectors, projection systems, optical components, computer systems, processors, self-contained projector systems, visual and/or audiovisual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments including the Internet, intranets, local area networks, wide area networks and so on.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define inventions unique in their own right. Also, the terminology used herein is for the purpose of description and not of limitation.

Figure 12:
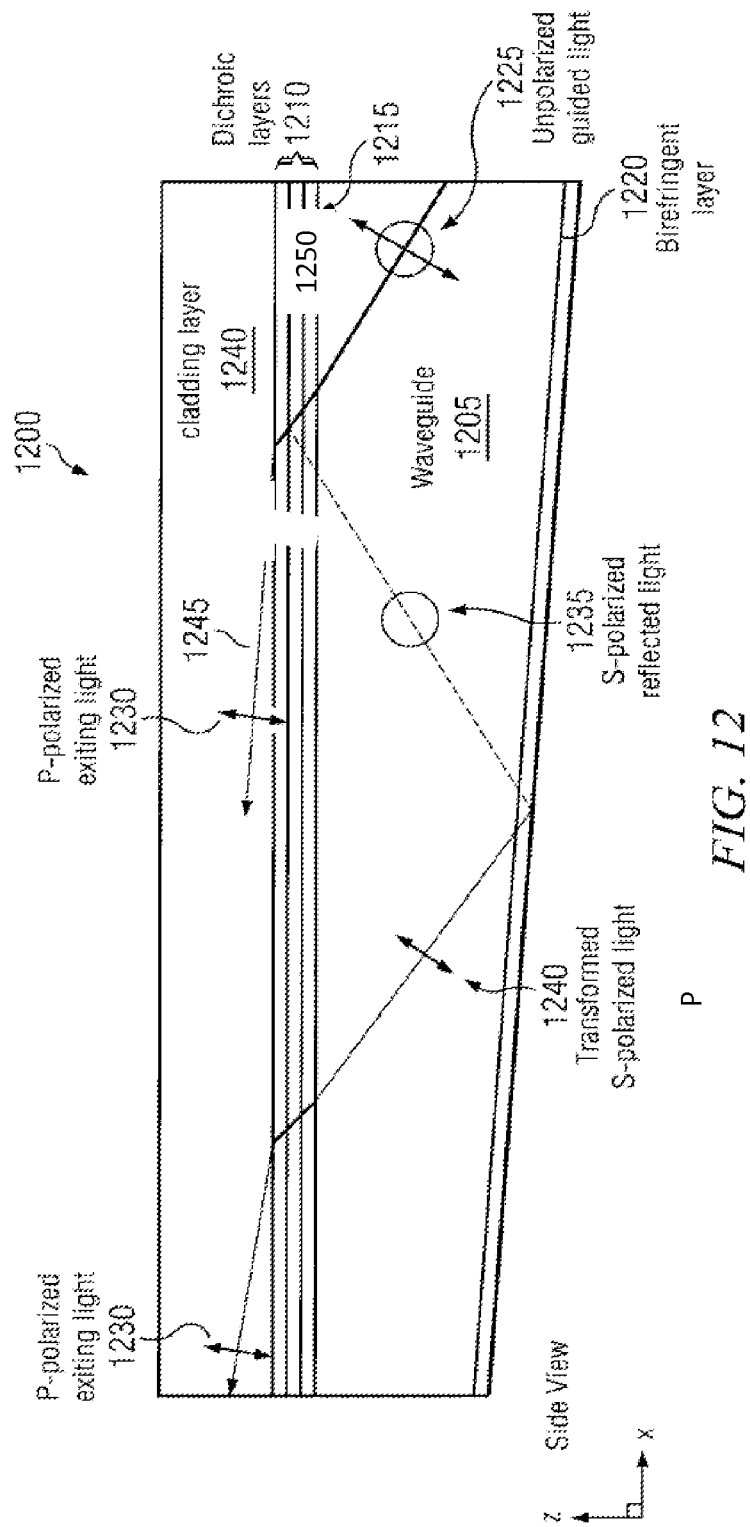
FIG. 12 is a close up view a backlight system which includes a wedge type waveguide constructed according to the principles disclosed herein.

An exemplary embodiment of the general concept of the disclosed principles is illustrated in FIG. 12. FIG. 12 illustrates a close up view a backlight system 1200 which includes a wedge type waveguide 1205 constructed according to the principles disclosed herein. In FIG. 12, a cross section of the waveguide 1205 illustrates a plurality of dichroic layers 1210 positioned on the exit surface 1215 of the waveguide 1205, an optional cladding layer 1250 on the dichroic layers 1210, and a birefringent layer 1220 positioned on the bottom surface of the waveguide 1205.

A collimated unpolarized ray of light 1225 is illustrated that back propagates at angles just steeper than the critical angle of the waveguide 1205. Unpolarized light 1225 at such an angle is incident on the dichroic layer stack 1210, which has high transmission of P-polarized light 1230 while reflecting most light that is S-polarized 1235. The S-polarized reflected light 1235 is shown as a hashed line in FIG. 12. This reflected S-polarized light 1235 then passes through a birefringent layer 1220, as illustrated in FIG. 12, which may be a film optically bonded to the back surface of the waveguide 1205 before being totally internally reflected back toward the exit surface 1215. Suitable orientation of the birefringent material's 1220 optic axis, together with the retardance value, efficiently transforms the lights 1235 S-polarization state into P-polarized light 1240. When the transformed P-polarized light 1240 encounters the dichroic layers 1210 for a second time, it passes through with minimal reflection since this light was already at or exceeded the critical exit angle of the waveguide 1205. In the ideal case, all the exiting light becomes P-polarized suitable for modulation by an LCD panel. In practice, the 1000:1 polarization purity is difficult to achieve, and thus the use of a clean-up polarizer after the dichroic layers 1210 may be employed. Nevertheless, significant polarization purity can be achieved, which provides system efficiencies greater than that resulting from conventional approaches, such as the use of dual brightness enhancement film (DBEF) for light exiting a waveguide.

One embodiment of a backlight system 1200 constructed in accordance with the disclosed principles may include at least some of the following design parameters: the wedge waveguide and reflector corrugation angle, the radius of curvature of the end reflector of the waveguide, the dichroic layer number and thicknesses, the orientation and retardance of the birefringent film, and the design of any extraction film employed with the waveguide. Each of these design parameters will be discussed in further detail herein. The design parameters may be determined in any order and are discussed accordingly.

Wedge Angle of the Waveguide

Figure 13:
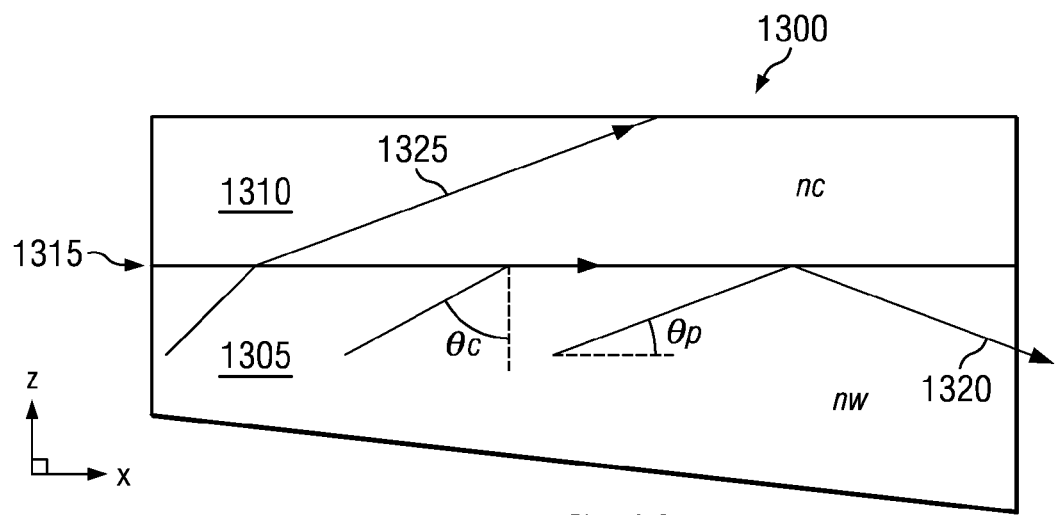
FIG. 13 is a schematic diagram illustrating a diagram for internal angle definitions, in accordance with the present disclosure.

FIG. 13 is a schematic diagram illustrating a close up diagram that illustrates internal angle definitions for backlight system 1300 constructed in accordance with the disclosed principles. The illustrated system 1300 includes a wedge type waveguide 1305 and a cladding material 1310 located above the exit side of the waveguide 1305. For light to propagate down a wedge waveguide 1305, few to no initial internal rays 1320 may have angles greater than approximately the critical incident angle θc from the waveguide exiting surface 1315, as shown in FIG. 13. Rays 1325 with angles less than the critical incident angle θc from the waveguide 1305 can exit the waveguide, also as shown in FIG. 13. This critical angle θc is determined by the refractive indices of the waveguide 1305 material (nw~1.492 for the example material acrylic) and the exiting surface cladding material 1310 (nc~1.41 for the example material silicone), where:

$$\theta c = \sin^{-1}\left(\frac{nc}{nw}\right) \approx 71°$$

The related propagation angles θp, which may be defined primarily from the principal propagation direction, may adhere to the following criterion for the exemplary materials mentioned above:

$|\theta p| < \theta pc = 90° - \theta \approx 19°$ where θpc is defined as the confinement angle.

Figure 14:
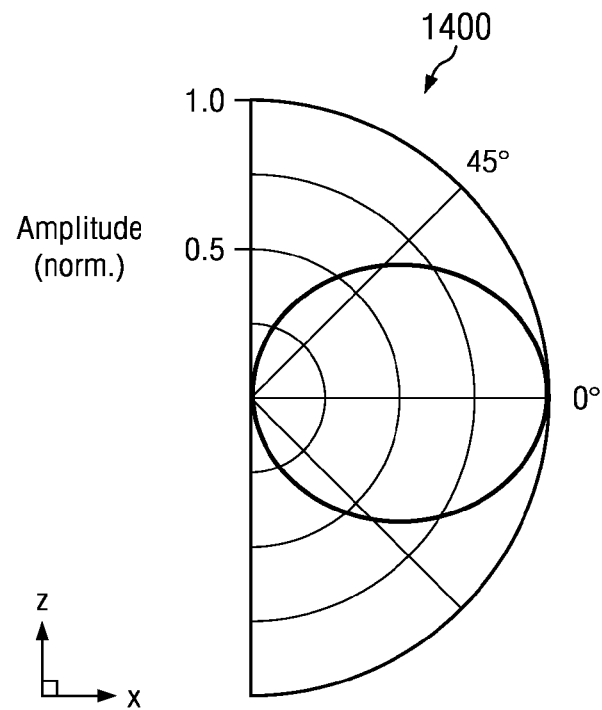
FIG. 14 is a schematic diagram illustrating a standard polar emission plot of an exemplary white LED.

Most LED backlights use white emitters that comprise a blue (~450 nm peak wavelength) diode encapsulated in a yellow phosphor. Packages for backlights are often approximately 2.5 mm×1 mm, with an angular emission profile similar to that shown in FIG. 14. FIG. 14 is a schematic diagram illustrating a standard polar emission plot of an exemplary white LED. The profile of FIG. 14 assumes emission into air, whereas entering a waveguide of the approximate index 1.492 may reduce the angular extent through refraction. As shown in FIG. 14, most of the light, and in some cases approximately 90 percent, may be contained within an azimuthally symmetric, approximately 50° cone, which equates to approximately 30° within the waveguide. To avoid losing light, a simple input wedge beam expander for each LED can be provided as part of the overall molded waveguide structure.

Figure 15:
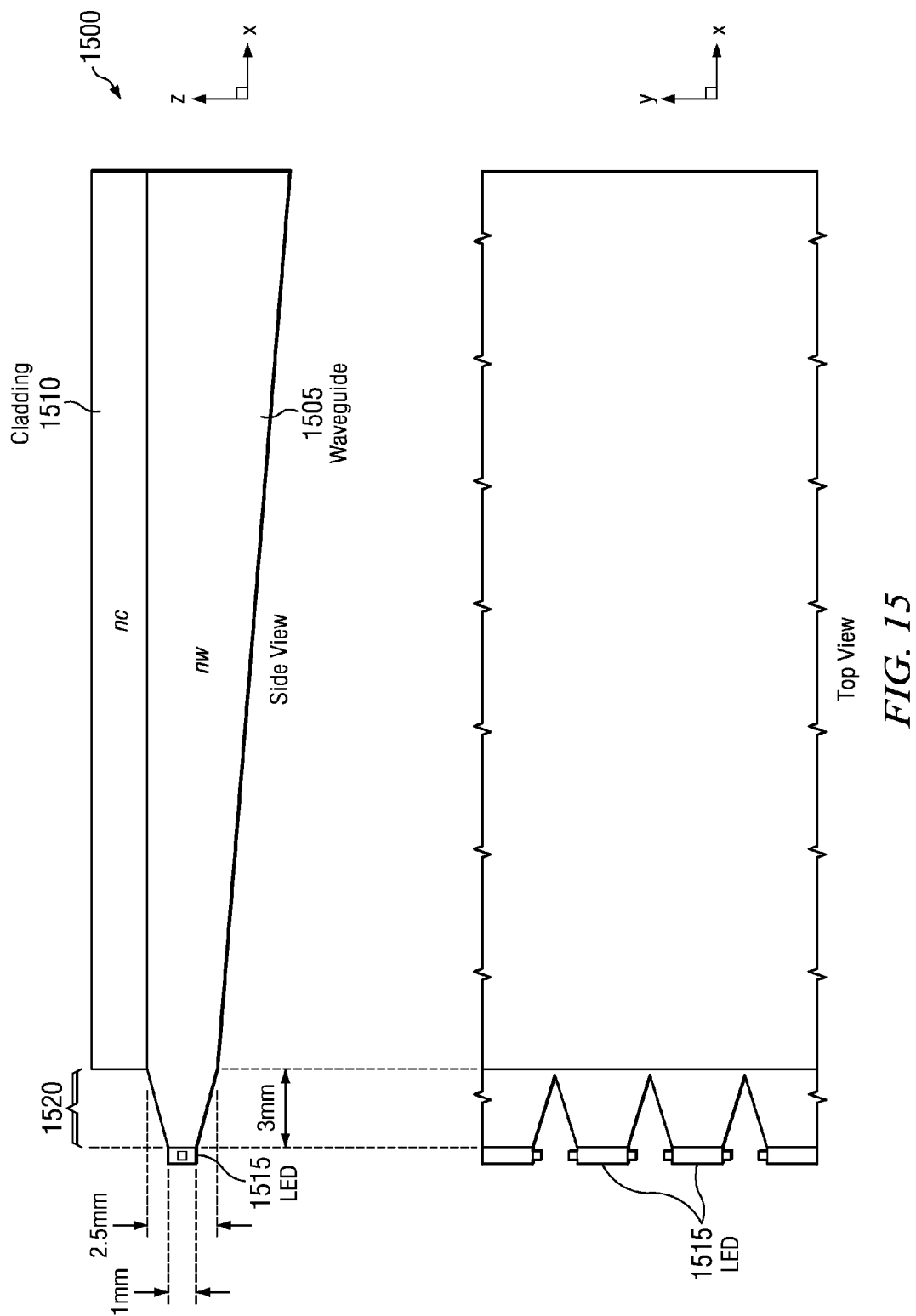
FIG. 15 is a schematic diagram illustrating a schematic showing flared beam expander waveguide extensions for LED angular tailoring.

FIG. 15 is a schematic diagram illustrating top and side views of one embodiment of a wedge type directional backlight system 1500. The exemplary backlight system 1500 includes a waveguide 1505 and a cladding layer 1510 located over the exit surface of the waveguide 1505, similar to embodiments discussed above. The system 1500 also includes flared beam expander waveguide extensions 1520 (a non-imaging optical element) for angular tailoring of LEDs 1515 used in the backlight system 1500. FIG. 15 shows a schematic of beam expander extensions 1520 to the waveguide 1505 that may limit the input ray angles to approximately ±19°, which may be approximately equal to ±θpc, in the plane substantially normal to the waveguide 1505 (side view in FIG. 15), and avoids gaps between the LEDs 1515 in the waveguide plane itself. The juxtaposition of the LEDs 1515 may reduce or prevent dark viewing regions in the final overall system 1500.

Figure 16:
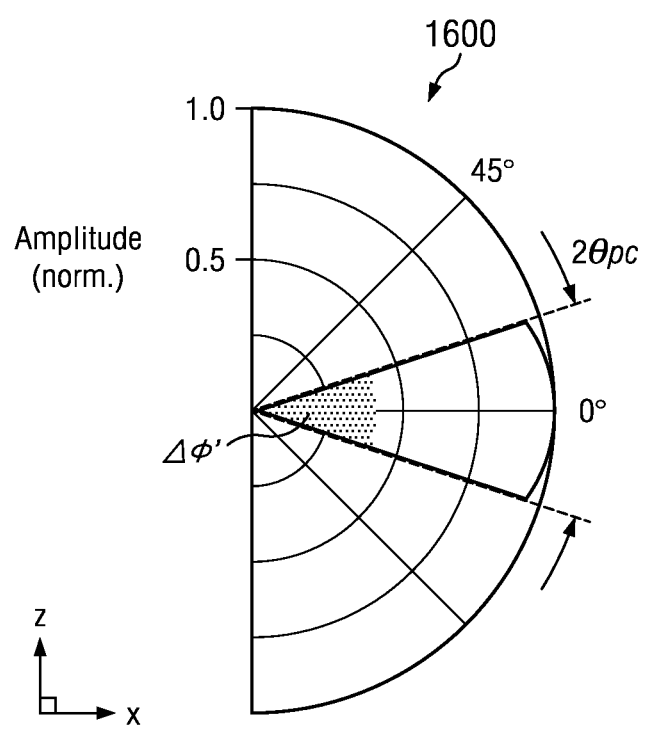
FIG. 16 is a schematic diagram illustrating a schematic representation of a compressed angular light input profile following expansion of LED output.

The effect of a wedge expander 1520 may be to compress the light and also to substantially homogenize the rays, thus producing an angular profile similar to that shown in FIG. 16. FIG. 16 is a schematic diagram illustrating a compressed angular light input profile 1600 following expansion of LED output. Most or all of the light may then be guided with little to no loss down the wedge waveguide, along the x-axis. The light may be confined in the z-axis direction through total internal reflection (TIR), but may expand in the xy plane of the guide consistent with the launch angles. Each reflection of the light from the non-parallel exit and bottom surfaces of a wedge-shaped waveguide may act to reduce the propagation angles. In a physically long waveguide, such as one which is significantly longer than its thickness, the angle spread may be compressed in accordance with the conservation of etendue. For small angles, the product: d.Δϕ may be conserved, where d is the thickness of the waveguide at a given position along the x-axis, and Δϕ is the total angular spread. Assuming the waveguide's thickness at the thicker or reflecting end is D, then the angular spread, Δϕ', of the rays hitting the surface may be compressed by a factor: d/D.

Figure 17:
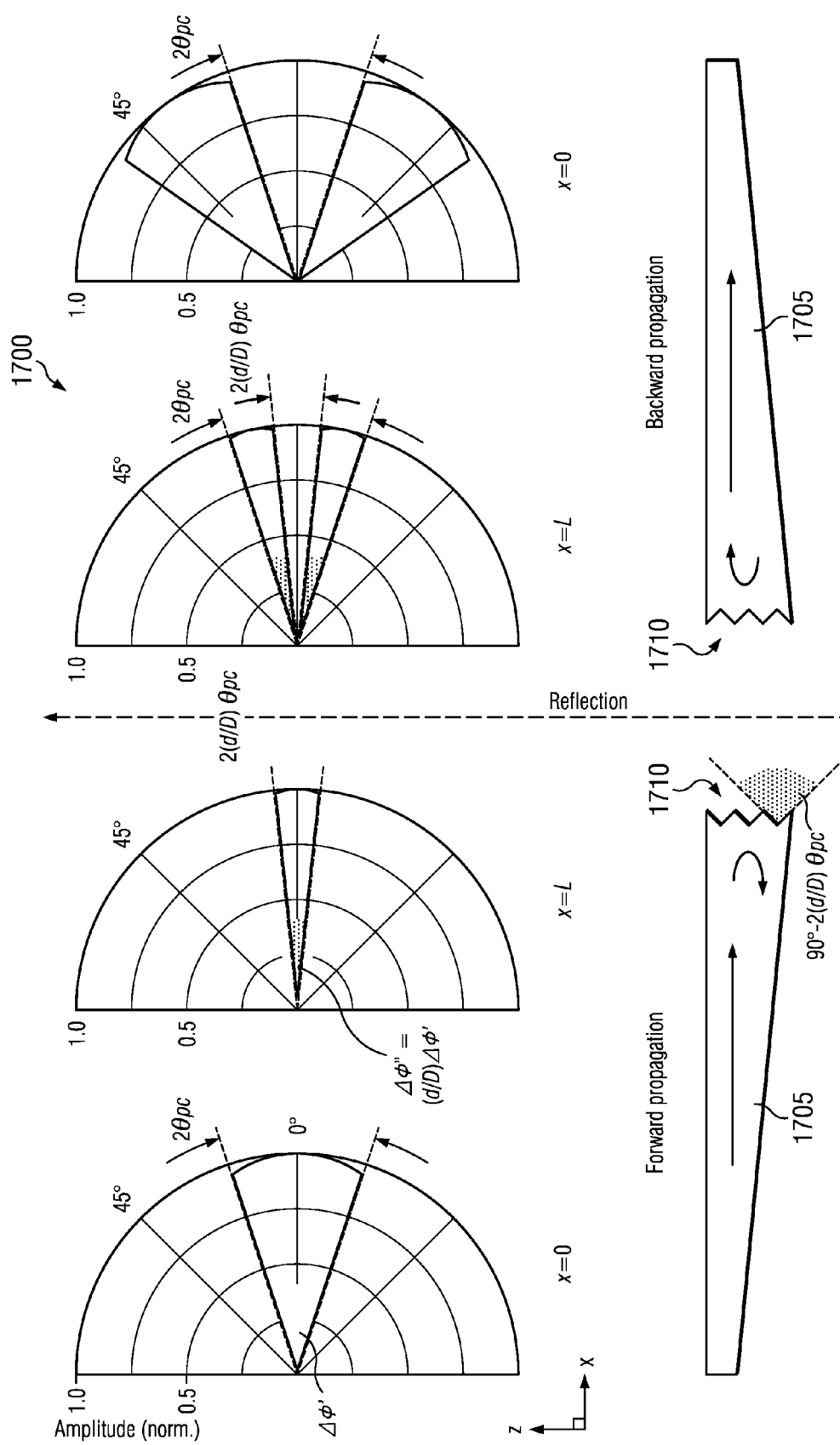
FIG. 17 is a schematic diagram illustrating a zx angle profile as light propagates forward and backward through a wedge with reflection from a corrugated end reflector, in accordance with the present disclosure.

On reflection, rays counter-propagate down the waveguide, and the angle spread of the rays may increase in a substantially symmetrical manner. Any rays that exceed the confinement angle θpc may escape the waveguide. With normal reflection, the angles may be within the confinement regime and, from the symmetry of the system, may reach the escape condition when they encounter the thin end of the wedge. Little to no light will therefore exit in this case. By introducing horizontal corrugations with apex angles of approximately 90°−(d/D)θpc onto the end reflection surface of the waveguide, the angular profile of the reflected light can be separated to provide two symmetric angular distribution lobes, as shown in FIG. 17. FIG. 17 is a schematic diagram illustrating a zx angle profile 1700 as light propagates forward and backward through a wedge waveguide 1705 with reflection from a corrugated end reflector 1710.

The number of corrugations on the end reflector 1710 may affect the distance taken to substantially homogenize the ray angles within the waveguide 1705 following reflection, with more corrugations providing a shorter distance for mixing. A guideline to the number of corrugations can be determined by realizing the size c of each corrugation may produce an angular hole in the ray distribution at a single first exit point at a distance z from the corrugated end reflector 1710, which may be equivalent to approximately c/z radians. To avoid a significant impact on illumination uniformity, the hole may not be larger than the spread of ray angles (=2θw≈2°) that escape the waveguide 1705 at any one position. A suitable homogenizing distance zh might be approximately ten millimeters in the case of a monitor, making a guideline number of corrugations of approximately D/c≈D/(zh·2θw)≈2θ, in which θw is expressed in radians.

As illustrated in FIG. 17, the angles may expand during the backward propagation, and may gradually exceed the confinement criterion causing light to exit and form an illumination beam. By the time the light gets back to the thin end of the waveguide 1705, most to all light may have escaped. The condition depicted by FIG. 17 is one in which the angular spread of the input light may closely match with the initial confinement condition and may minimize the input wedge thickness. The corresponding thickness of the reflecting end 1710 may then become approximately 3× the input width. For the approximately one millimeter LED expanded to approximately 2.5 millimeter input considered in this exemplary embodiment, the reflecting end 1710 may be approximately 7.5 millimeters. This may be feasible for a laptop/monitor/TV implementation. Assuming an approximately 23 inch monitor platform, the wedge angle θw, which may be associated with an approximately five millimeter change in thickness over a vertical height of approximately 300 millimeters, may be approximately 5/300 radians or approximately one degree. Physically smaller LEDs may be considered for hand-held display implementations which may reduce this angle and overall thicknesses.

In summary, the wedge angle in radians may be the product of: the LED size, Le, the input angular contraction factor 2.5, the wedge contraction factor, 3, divided by the length of the wedge, L, or:

$$\theta w = \frac{7.5 Le}{L}$$

Reflector Curvature Radius

Figure 18:
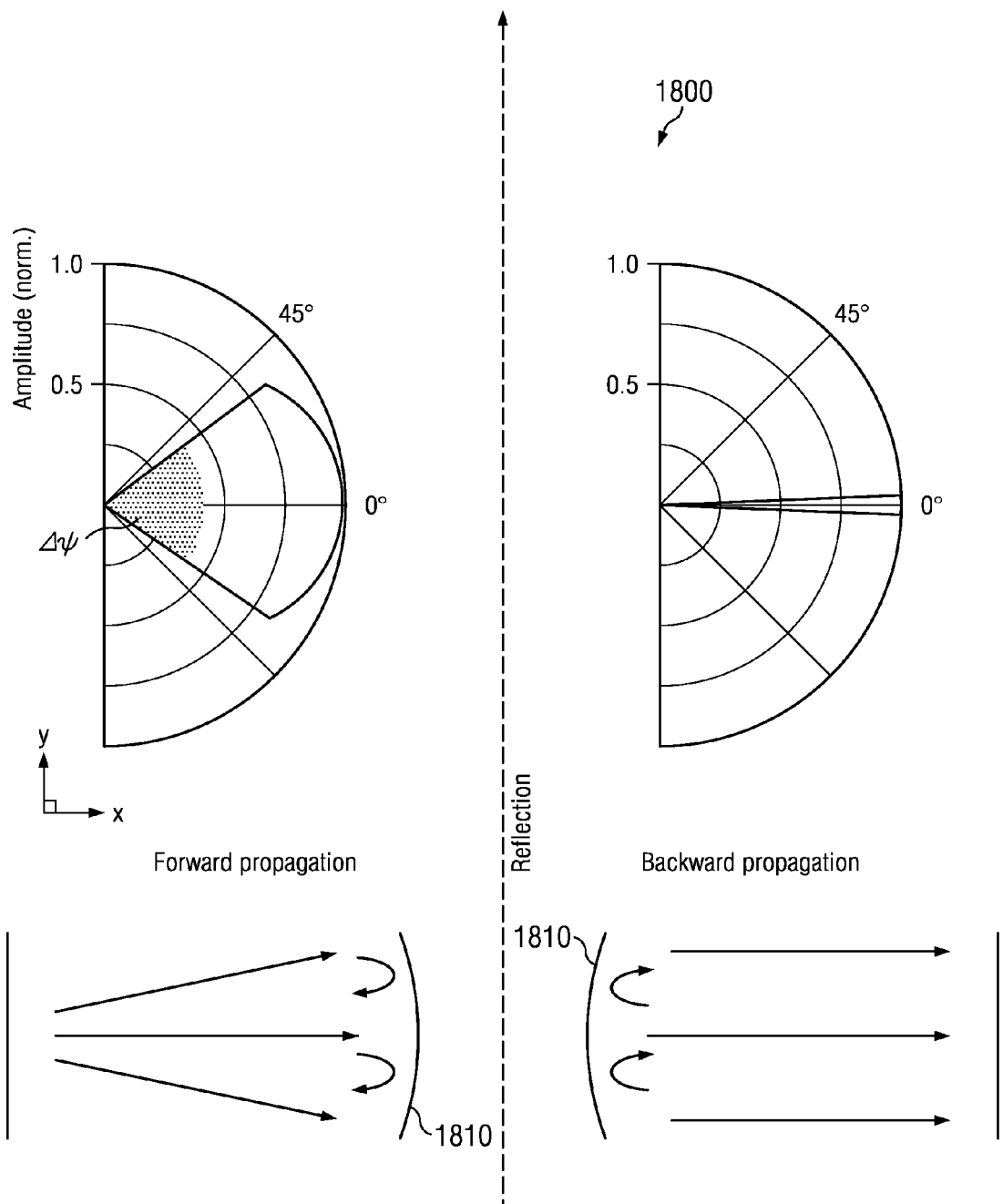
FIG. 18 is a schematic diagram illustrating collimation of light on reflection in the xy plane.
Figure 19:
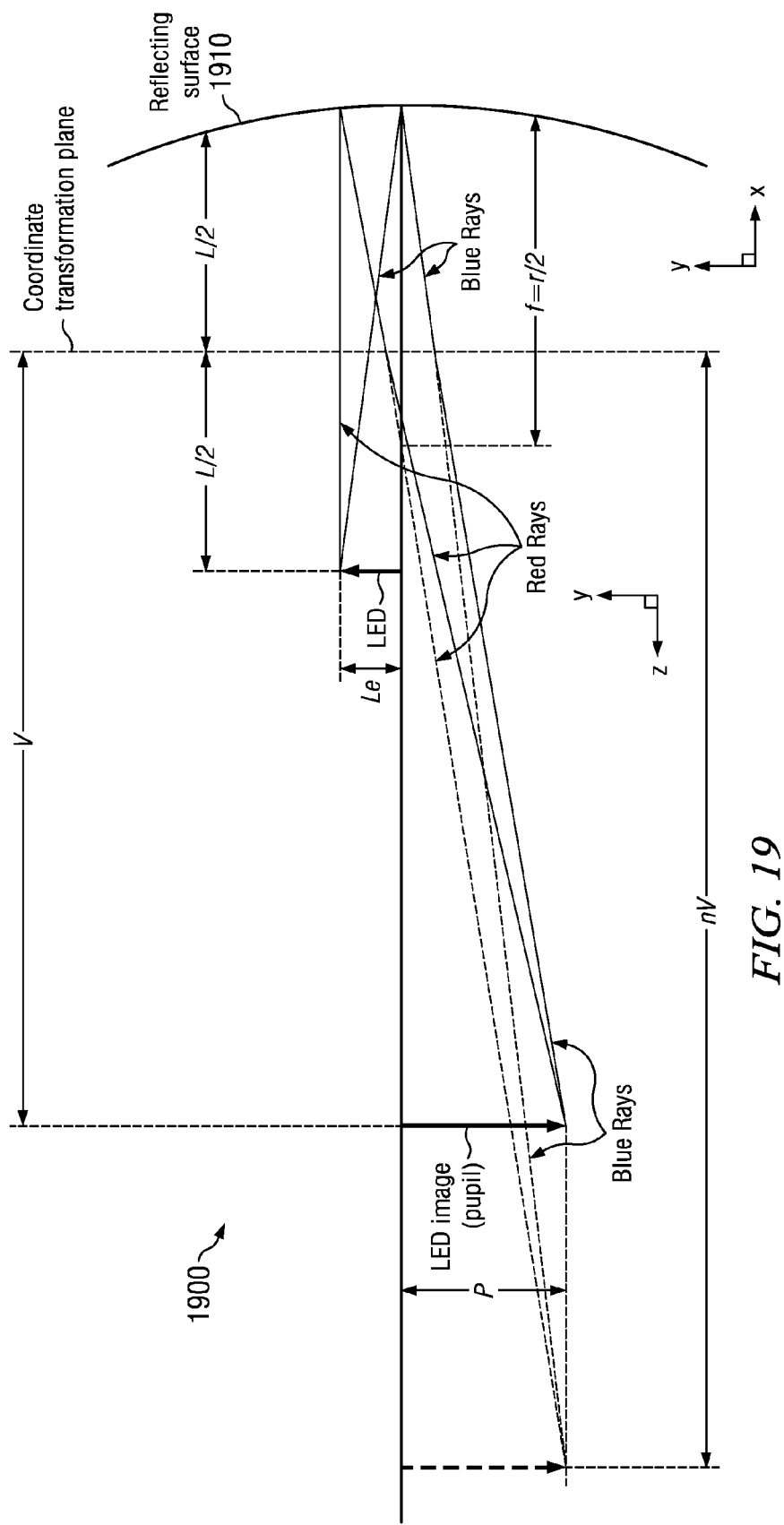
FIG. 19 is a schematic diagram illustrating a geometrical image forming construction diagram for determining reflector radius of curvature, in accordance with the present disclosure.

A similar analysis to that above can be considered for ray angles in the xy plane of a waveguide in accordance with the disclosed principles. Initial ray angular profile may be determined by the light expander as in the case above. Freedom to choose the exit size and expander length allows for somewhat controlled angular profile of the type shown on the left side of FIG. 18. FIG. 18 is a schematic diagram illustrating an angular profile 1800 of the collimation of light on reflection in the xy plane in wedge type waveguides. This angular profile may be retained in the unconfined waveguide plane, but may be collimated on reflection, as shown in the right side of FIG. 18. The extent to which the rays may be collimated, and therefore the curvature of the end reflector 1810, may be determined through geometrical optical analysis. A valid construction may consider conventional ray tracing in the xy plane, and then may introduce a rotation of coordinates where the light departs from the waveguide. It may be assumed that the central rays forming the LED image, for example, the final exit pupils, exit approximately halfway along the waveguide. The coordinate rotation may unfold the rays that would head toward the viewer, allowing them to be plotted with a substantially similar familiar geometric image formation construction. The resulting diagram is shown in FIG. 19. FIG. 19 is a schematic diagram illustrating a geometrical image forming construction diagram 1900 for determining reflector radius of curvature 1910. First exemplary light rays (e.g., red rays) and second exemplary light rays (e.g., blue rays) are plotted in FIG. 19 to help illustrate the determination of the radius of curvature for the reflecting end of a waveguide constructed as disclosed herein. Similar triangles may provide the source magnification M as:

$$\frac{P}{Le} = \frac{n \cdot V + \frac{L}{2} - \frac{r}{2}}{\frac{r}{2}}$$

for the rays labeled red rays; and $$\frac{P}{Le} = \frac{n \cdot V + \frac{L}{2}}{L}$$

for the rays labeled blue rays (e.g., the remaining rays).

Combining the above yields the following solution for the radius curvature of the end reflector:

$$r = 2 \cdot L \cdot \frac{(2 \cdot n \cdot V + L)}{(3 \cdot L + 2 \cdot n \cdot V)}$$

In the monitor example, L may be approximately 300 millimeter, and the viewing distance V may be approximately 750 millimeters. The waveguide index n=nw≈1.492 may be consistent with optical grade acrylic, thus providing the radius of curvature r≈485 millimeters. The pupil magnification M may then be approximately 4.2, making the physical size of an extended LED source corresponding to a single eye light box approximately 65/4.2 or approximately 15 millimeters.

Figure 20:
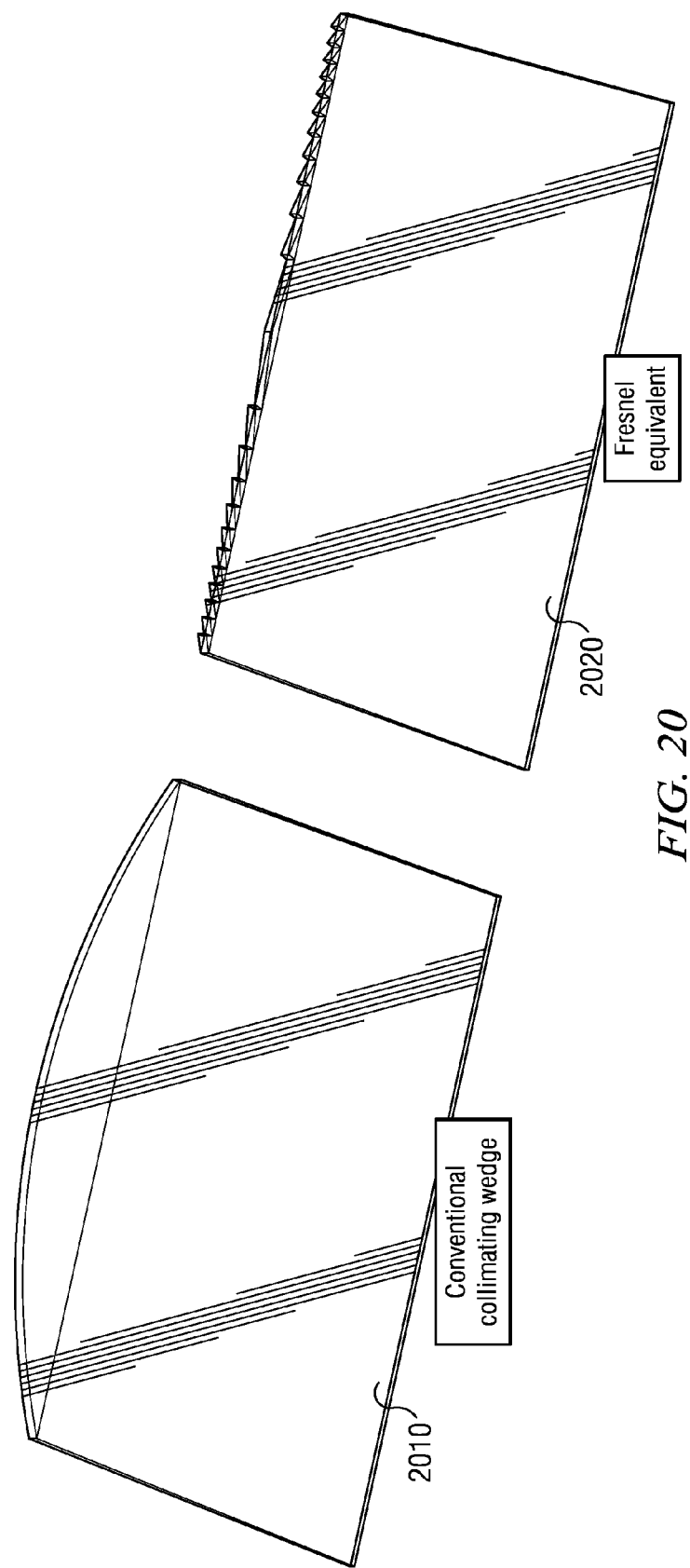
FIG. 20 is a schematic diagram illustrating one embodiment of a conventional wedge type directional backlight illuminator with an equivalent Fresnel structure.

The illuminator region defined within the curved edge may be outside the viewing region, which may be impractical in many cases where edge bevels may be minimal. To reduce the illuminator overhang, the curved surface can be replaced with a Fresnel equivalent as shown in FIG. 20. FIG. 20 sets forth a schematic diagram illustrating one embodiment of a wedge type directional backlight waveguide illuminator 2010 with an equivalent Fresnel waveguide structure 2020.

Dichroic Layer Thicknesses

The design of a polarization selective reflecting dichroic layer stack may be somewhat dependent on the angular extent of the light incident on the stack. In this case, light that exceeds the confinement angle θpc may be considered as all other light may be substantially to completely reflected regardless of polarization. Also, to provide the desired output collimation, most or all light that exceeds the confinement angle may exit the waveguide as soon as possible with minimal bouncing within the waveguide. This may limit the incident angles to be considered. The extent of the collimation of the light exiting the waveguide may be approximately determined by the number of bounces before total extraction, together with the angle increase between bounces. For a perfect system, where light exits with no reflection after exceeding the confinement condition, the angular spread of exiting rays incident on the dichroic stack within the waveguide is simply twice the wedge angle. With good polarization conversion it may be expected that the light may exit after two bounces, making the ray angle spread at the dichroic stack equal to approximately 4·θw or approximately 4 degrees for the exemplary embodiment herein.

Standard optimization techniques can be used to determine a suitable dichroic stack, such as those employed in software like TFCalc, a thin film design software package supplied by Software Spectra Inc., of Portland, Oreg. Optimizing for a cost effective three layer solution with a typical cladding material index may yield the following exemplary solutions set forth in TABLE 1, in which dispersion is included in the optimization:

TABLE 1

| Material | Refractive index | Thickness (nm) |
| --- | --- | --- |
| Acrylic (Waveguide) | 1.492 | |
| TiO$_2$ | 2.4 | 140 |
| MgF$_2$ | 1.38 | 240 |
| TiO$_2$ | 2.4 | 21 |
| Cladding | 1.41 | |

Figure 21:
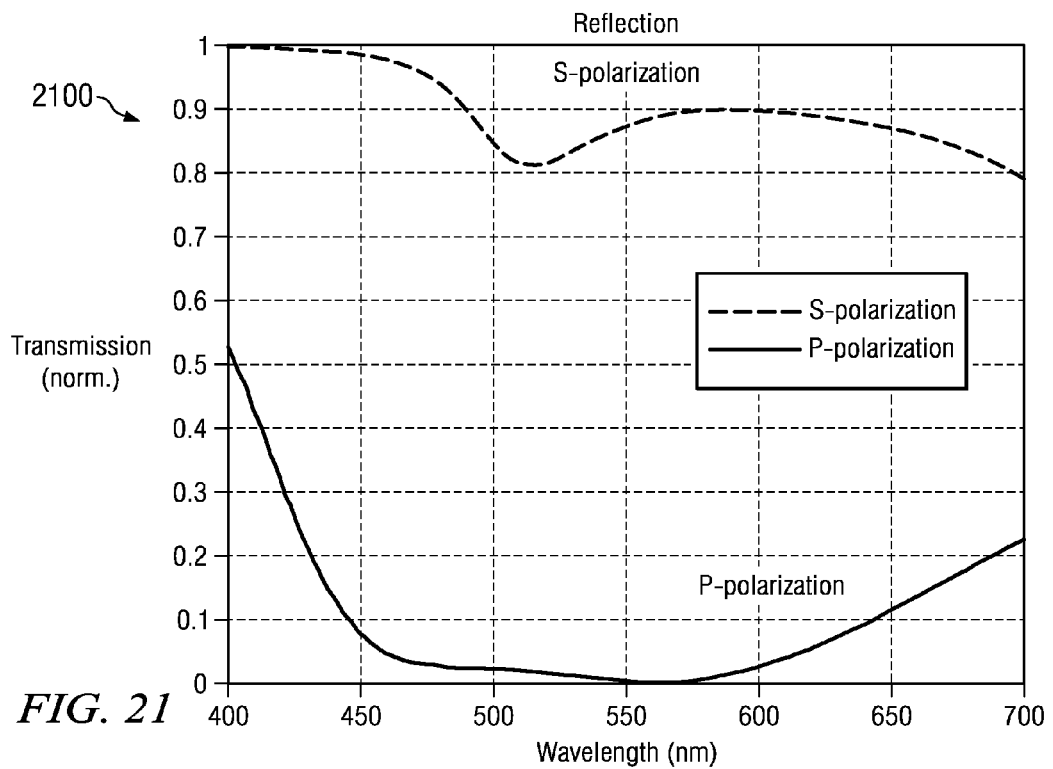
FIG. 21 is a schematic diagram illustrating a graph of reflectivity off the dichroic layer stack, in accordance with the present disclosure.

FIG. 21 is a schematic diagram illustrating one embodiment of a graph 2100 of reflectivity off an exemplary dichroic layer stack in accordance with the disclosed principles.

FIG. 21 illustrates the transmission of the aforementioned coating for an average exiting ray incident at approximately 2° larger than the confinement angle. Assuming the reflected S-polarized ray is transformed into P-polarization before next hitting the exit surface of the waveguide, the double bounce polarization efficiency may be calculated at approximately 80%.

Polarization Transformation Layer

Figure 22:
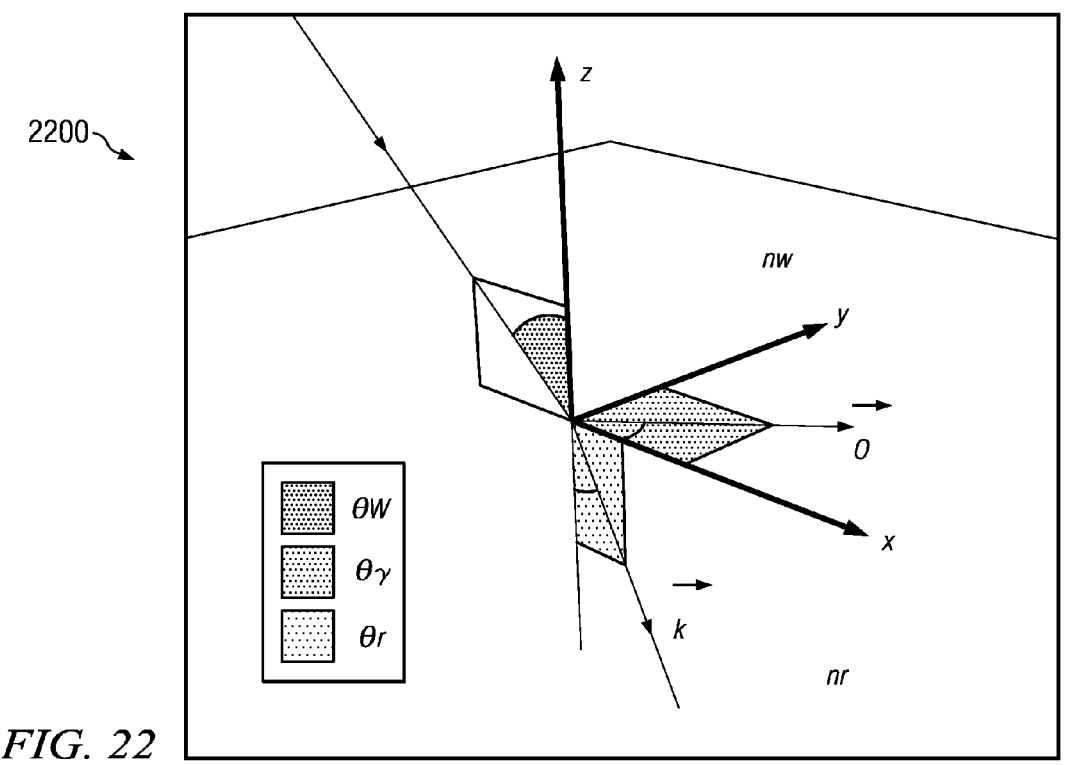
FIG. 22 is a schematic diagram illustrating incidence geometry of a ray entering a polarization transforming retarder layer from the waveguide, in accordance with the present disclosure.

In general, a method of transforming or converting polarization may be to use a half-wave retarder film oriented such that its optic axis is approximately 45° to the light's polarization direction in the plane approximately perpendicular to propagation. The determination of the correct orientation and retardance value of a uniaxially stretched film attached to the bottom of the waveguide in question can be done geometrically. Relevant angle definitions are illustrated in FIG. 22. FIG. 22 is a schematic diagram 2200 illustrating incidence geometry of a ray entering a polarization transforming retarder layer from a waveguide.

A ray incident at angle $\theta i$ ($\approx \theta c - 2° \approx 69°$) on the waveguide/retarder interface enters the retarder at the approximate angle $\theta r$ in which:

$$\theta r = \mathrm{asin}\left(\frac{nw}{nr} \cdot \sin(\theta i)\right)$$

Thus, inside the retarder the ray may have a propagation vector (k-vector) described as:

$$\vec{k} = \begin{pmatrix} \sin(\theta r) \\ 0 \\ -\cos(\theta r) \end{pmatrix} = \begin{bmatrix} \frac{nw}{nr} \sin(\theta i) \\ 0 \\ -\sqrt{1 - \left(\frac{nw}{nr} \cdot \sin(\theta i)\right)^2} \end{bmatrix}$$

and the retarder's optic axis by:

$$\vec{O} = \begin{pmatrix} \cos(\theta \gamma) \\ \sin(\theta \gamma) \\ 0 \end{pmatrix}$$

The ordinary polarization axis may then be approximately parallel to:

$$\vec{k} \times \vec{O} = \begin{pmatrix} \sin(\theta r) \\ 0 \\ -\cos(\theta r) \end{pmatrix} \times \begin{pmatrix} \cos(\theta \gamma) \\ \sin(\theta \gamma) \\ 0 \end{pmatrix} = \begin{pmatrix} \cos(\theta r) \cdot \sin(\theta \gamma) \\ -\cos(\theta r) \cdot \cos(\theta \gamma) \\ \sin(\theta r) \cdot \sin(\theta \gamma) \end{pmatrix}$$

For efficient polarization conversion, this vector may need to be approximately 45° from the S-polarization direction in which:

$$\vec{S} = \begin{pmatrix} 0 \\ -1 \\ 0 \end{pmatrix}$$

The negative option described as the positive value may yield an imaginary solution. This may imply solving:

$$\frac{(\vec{k} \times \vec{O}) \cdot \vec{S}}{|\vec{k} \times \vec{O}|} = \cos(45 \text{ deg})$$

Algebraic manipulation may yield the following solutions:

$$\theta \gamma = \begin{pmatrix} \mathrm{atan}(\cos(\theta r)) \\ -\mathrm{atan}(\cos(\theta r)) \end{pmatrix}$$

which, in this example case may lead to $\theta \gamma \approx \pm 22.5°$.

The effective ordinary and extraordinary refractive indices may first be calculated and used to determine the retardance value $\Gamma$ of the transforming film. Assuming a cost effective uniaxially stretched film is used, the ordinary index, no, may remain substantially unchanged for any incident ray. The extraordinary index ne may, however, be determined by the ray's propagation direction ($\theta = \mathrm{a}\cos(\vec{k} \cdot \vec{O})$) relative to the film optic axis, and may be determined by:

$$\frac{1}{ne^2} = \frac{\cos(\theta)^2}{no^2} + \frac{\sin(\theta)^2}{(no + \Delta n)^2}$$

Replacing ne with (no+Δn') and recognizing Δn and Δn'<<no, this expression can be expanded to give:

$$\Delta n' = \sin(\theta)^2 \cdot \Delta n$$

For a film of thickness d, the retardance value may be $\Gamma = \Delta n \cdot d$.

In one example of a reflective case, the net retardance experienced by a double pass though the film may be:

$$\frac{2 \cdot \Delta n' \cdot d}{\cos(\theta r)},$$

which can be re-expressed in the following ways:

$$\frac{2 \cdot \sin(\vec{k} \cdot \vec{O})^2 \cdot \Gamma}{\cos(\theta r)} = \frac{2 \cdot \sin(\mathrm{acos}(\sin(\theta r) \cdot \cos(\theta \gamma)))^2 \cdot \Gamma}{\cos(\theta r)}$$

$$= \frac{2 \cdot (1 - \sin(\theta r)^2 \cdot \cos(\theta \gamma)^2) \cdot \Gamma}{\cos(\theta r)}$$

Equating this last expression to a half-wave or $\lambda/2$, the result is:

$$\Gamma = \frac{\lambda \cdot \cos(\theta r)}{4 \cdot (1 - \sin(\theta r)^2 \cdot \cos(\theta \gamma)^2)}$$

Substituting the values obtained above for θr (≈65.5°) and θγ (≈25.5°) may provide a film retardance value that yields a half-wave at approximately λ=589 nanometers of approximately 187 nanometers.

Extraction Film

As determined above, the light that may be extracted from the breakdown of the TIR condition may be incident on the extraction surface of the waveguide at angles between approximately θc and θc−4·θw. This may translate through Snell's law into angles φ within the cladding layer, in which:

$$\mathrm{asin}\left(\frac{nc}{nw}\sin(\theta c)\right) > \phi > \mathrm{asin}\left(\frac{nc}{nw}\sin(\theta c - 4\cdot\theta w)\right)$$

or $90° > \phi > 76.7°$ for $\theta w = 1°$

Figure 23:
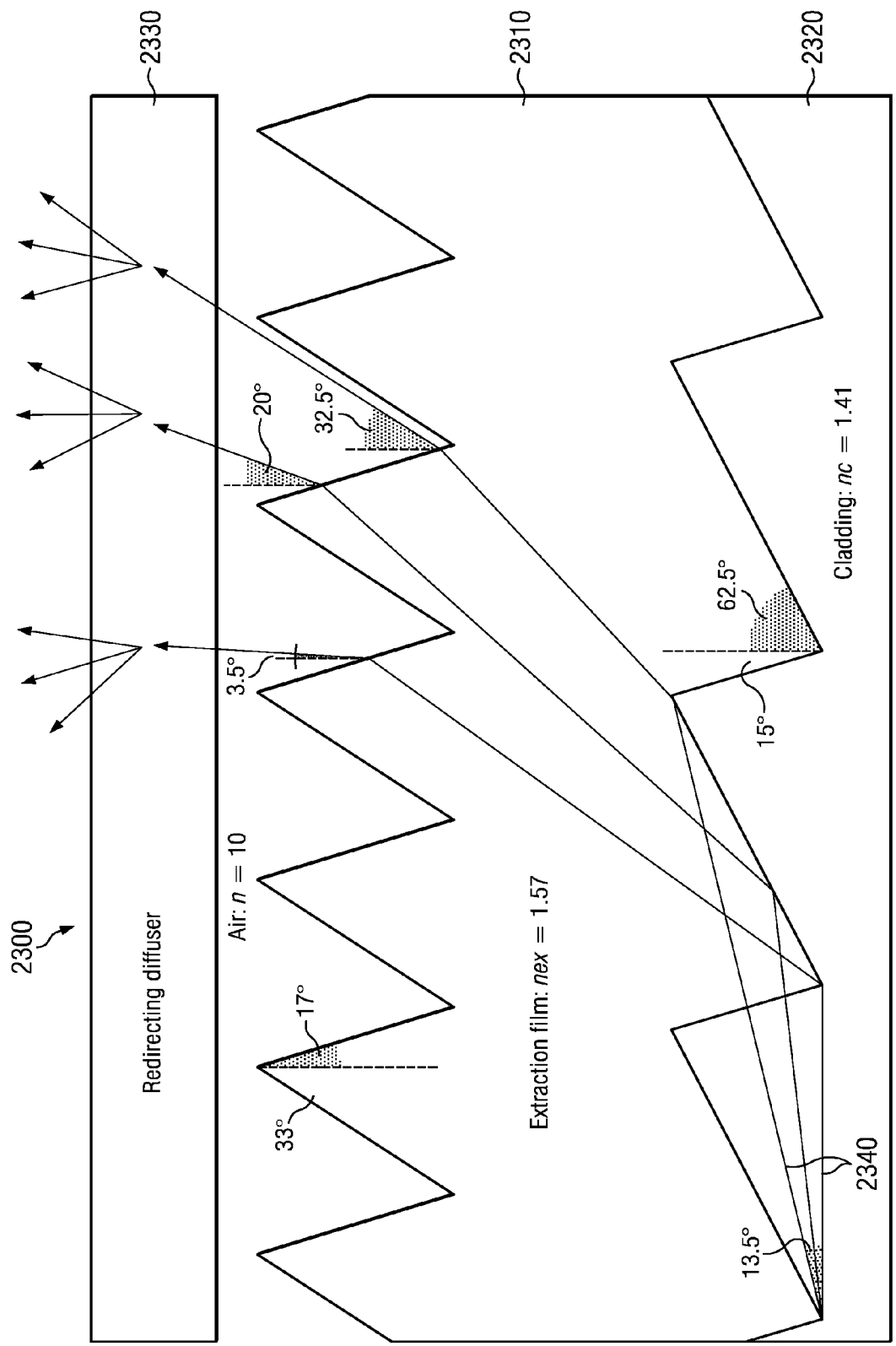
FIG. 23 is a schematic diagram illustrating an extraction film profile used to redirect illuminating light, in accordance with the present disclosure.

To provide normal illumination, these angles may be redirected by approximately 80°. This may be achieved by both reflecting and refracting by using a double-sided, one dimensional 'sawtooth' redirection film 2310 located on the cladding layer 2320, as well as an additional directional diffuser 2330, as shown in FIG. 23. FIG. 23 is a schematic diagram illustrating a close up side view of an extraction film profile 2300 used to redirect illuminating light 2340 exiting from a waveguide that may be constructed in accordance with the disclosed principles.

Figure 24:
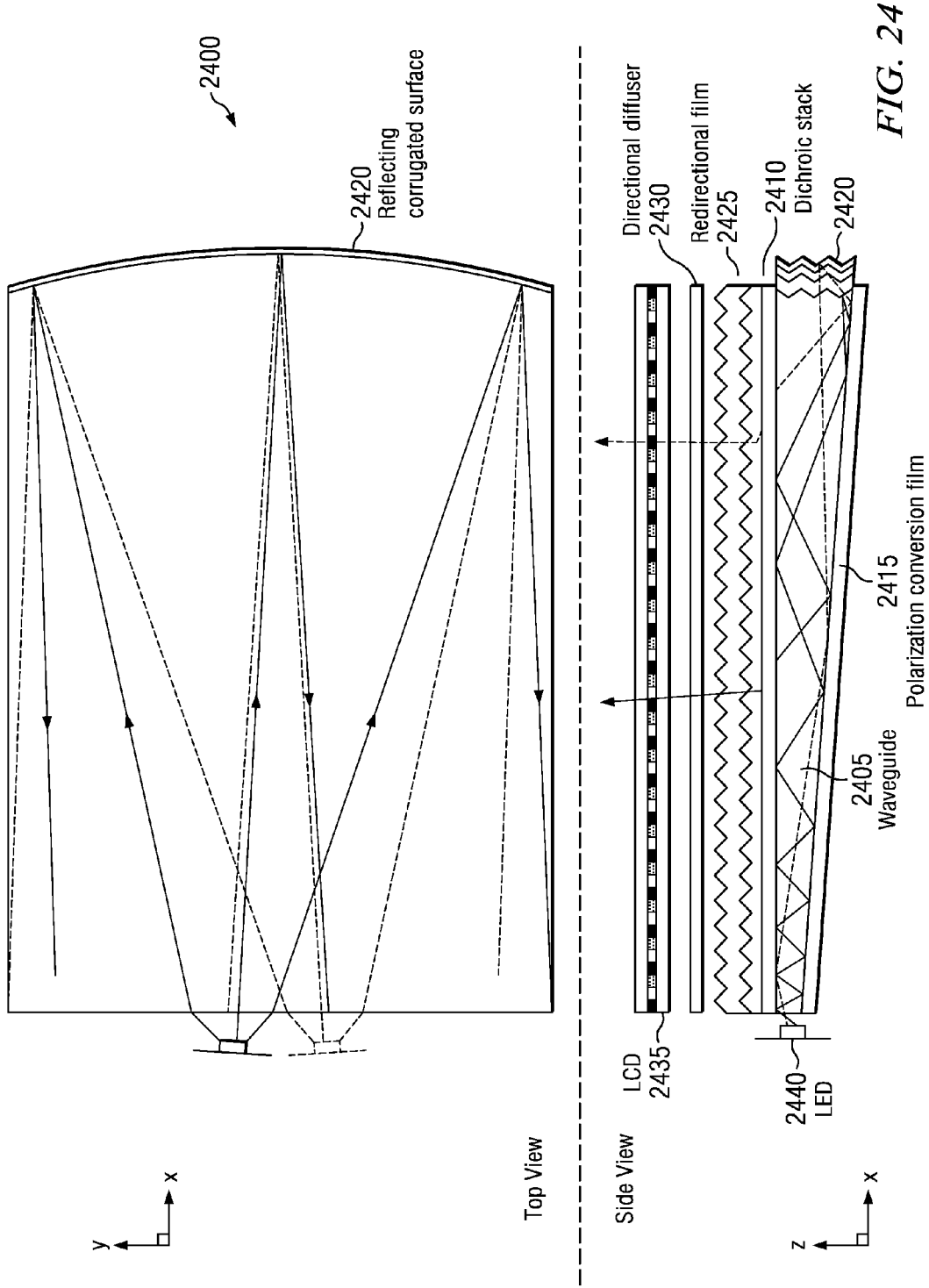
FIG. 24 is a schematic diagram illustrating one embodiment of a waveguide structure, in accordance with the present disclosure.
Figure 25:
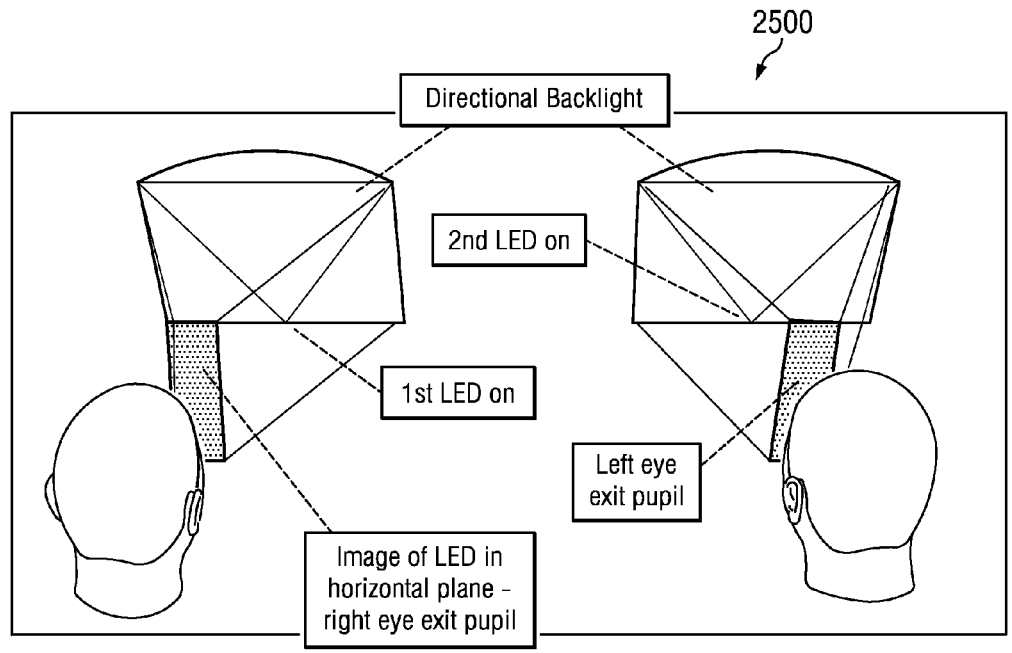
FIG. 25 is a schematic diagram illustrating one embodiment of the operation of directional backlight for selective eye viewing and time sequential stereoscopic operation, in accordance with the present disclosure.

Another embodiment for provide normal illumination is illustrated in FIG. 24 and the corresponding method to provide separate panel illumination for each eye is illustrated in FIG. 25. FIG. 24 is a schematic diagram illustrating top and side views of another embodiment of a waveguide structure 2400 constructed in accordance to the disclosed principles, and which includes directional layers for exiting rays. In this embodiment, a wedge waveguide 2405 again includes a dichroic stack 2410 on its exit surface, and a polarization conversion film 2415 on its bottom surface, as discussed above. This embodiment also includes a corrugated reflecting end 2420 on the waveguide 2405 for redirecting lights rays during backward propagation as discussed above. Additionally, a redirection film 2425 is employed above the dichroic stack 2410, and which may include two or more patterns therein for redirecting rays exiting from the waveguide 2405 to a more normal angle. A directional diffuser 2430 may also be employed to more evenly distribute the substantially normal rays for more uniform illumination of, for example, an LCD panel 2435 having alternating stereoscopic left eye and right eye imagery of a scene. LEDs 2440 in an LED array provide the initial lights rays into the waveguide 2405, as discussed above.

Figure 26:
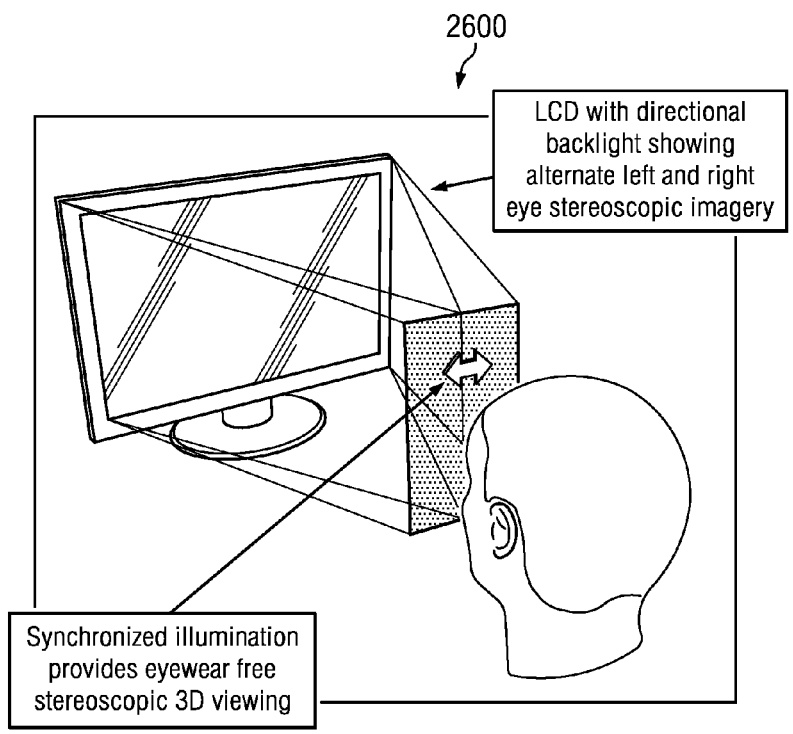
FIG. 26 is a schematic diagram illustrating one embodiment of an eyewear-free stereoscopic display system using a directional backlight, in accordance with the present disclosure.

FIG. 25 is a schematic diagram 2500 illustrating the operation of directional backlighting for selective eye viewing and time sequential stereoscopic operation, in accordance with the disclosed principles. In such embodiments, as the LCD panel presents alternating left eye and right eye imagery, directional backlighting may be provided by an efficient illumination system as disclosed herein in synchronization with the left and right eye images. A final auto-stereoscopic system is shown in FIG. 26. More specifically, FIG. 26 sets forth a schematic diagram illustrating an eyewear-free stereoscopic display system 2600 using a directional backlight in accordance with the principles disclosed herein.

Other advantages of directional backlighting, discussed in further detail herein, may include secure viewing, in which only the viewer sees the image on the display due to the narrow viewing window and efficiency. Modest illumination power may be employed since the illumination may be directed substantially toward the viewer's eyes and not elsewhere. Yet further advantageous features of this technology can be exhibited by incorporating more than two independent LEDs (or LED arrays) along with head tracking. These include the freedom of head position and multiple viewers of stereoscopic imagery.

As may be used herein, the terms "substantially" and "approximately" provide an industry-accepted tolerance for its corresponding term and/or relativity between items. Such an industry-accepted tolerance ranges from less than one percent to ten percent and corresponds to, but is not limited to, component values, angles, etc. Such relativity between items ranges between less than one percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

What is claimed is:

1. An illumination system for use with an electronic display system, the illumination system comprising:

an optical waveguide having a near end and a reflecting far end, a thickness of the waveguide at the reflecting end greater than a thickness at the near end, the waveguide further comprising an exit surface extending between the near and far ends and having a critical angle above which light rays may exit the waveguide;

at least one dichroic layer located on the exit surface of the waveguide, the at least one dichroic layer configured to transmit exiting light rays having a first polarization and to reflect exiting light rays having a second polarization, different than the first polarization; and a polarization conversion film located on a surface of the waveguide opposite the exit surface, the polarization conversion film configured to transform the polarization of at least some of the exiting light rays having the second polarization reflected by the at least one dichroic layer to transformed light rays having the first polarization, and to reflect the transformed light rays having the first polarization back into the waveguide such that at least a portion of the transformed light rays having the first polarization may exit the waveguide and pass through the at least one dichroic layer.

2. An illumination system in accordance with claim 1, wherein the at least one dichroic layer comprises a dichroic stack of at least three dichroic materials, stacked in alternating high and low refractive indices.

3. An illumination system in accordance with claim 1, wherein the polarization conversion film comprises a birefringent film.

4. An illumination system in accordance with claim 1, further comprising a cladding layer located proximate the at least one dichroic layer, the cladding layer configured to redirect at least some exiting light rays to an angle approximately normal to the exit surface.

5. An illumination system in accordance with claim 1, wherein the reflecting end further comprises a curvature extending along a plane substantially parallel to the exit surface's plane.

6. An illumination system in accordance with claim 1, wherein the reflecting end comprises at least one corrugation on an internal surface thereof.

7. A method of illuminating an electronic display system, the method comprising:
  transmitting light rays into a waveguide comprising an exit surface having a critical angle above which light rays may exit the waveguide, wherein a portion of the transmitted light rays exit the waveguide through the exit surface;
  transmitting exiting light rays having a first polarization towards a display panel, while reflecting exiting light rays having a second polarization, different than the first polarization, back into the waveguide by locating at least one dichroic layer proximate to the exit surface of the waveguide, the at least one dichroic layer configured to transmit exiting light rays having a first polarization and to reflect exiting light rays having a second polarization, different than the first polarization; and
  transforming the polarization of at least some of the reflected light rays having the second polarization into light rays having the first polarization; and
  reflecting the transformed light rays back towards the exit surface such that at least a portion of the transformed light rays exit the waveguide.

8. A method in accordance with claim 7, wherein the method comprises transmitting exiting light rays having the first polarization towards a display panel, and reflecting exiting light rays having the second polarization, using at least one dichroic layer located on the exit surface.

9. A method in accordance with claim 8, wherein the at least one dichroic layer comprises a dichroic stack of at least three dichroic materials, stacked in alternating high and low refractive indices.

10. A method in accordance with claim 7, wherein transforming the polarization of at least some of the reflected light rays having the second polarization into transformed light rays having the first polarization comprises employing a birefringent film.

11. A method in accordance with claim 7, further comprising redirecting at least some light rays passing towards the display panel to an angle approximately normal to the exit surface.

12. A method in accordance with claim 11, wherein redirecting comprises redirecting the at least some light rays passing towards the display panel using a cladding material.

13. A method in accordance with claim 7, wherein the waveguide comprises a near end and a reflecting far end, a thickness of the waveguide at the reflecting far end being greater than a thickness at the near end, wherein at least a portion of the lights rays exiting the waveguide reflect off of the reflecting end.

14. A method in accordance with claim 13, wherein the reflecting far end comprises a curvature extending along a plane substantially parallel to the exit surface's plane.

15. A method in accordance with claim 13, wherein the reflecting far end comprises at least one corrugation on an internal surface thereof.

16. An electronic display system, comprising:
  an optical waveguide having a near end and a reflecting far end, a thickness of the waveguide at the reflecting far end greater than a thickness at the near end, the waveguide further comprising an exit surface extending between the near and far ends and having a critical angle above which light rays may exit the waveguide;
  at least one illumination unit configured to transmit lights rays into the waveguide through the near end;
  at least one dichroic layer located proximate to the exit surface of the waveguide, the at least one dichroic layer configured to pass P-polarized light rays exiting the waveguide and to reflect S-polarized light rays;
  a display panel for providing images for display to a viewer of the display system, and configured to receive the P-polarized light rays passing through the at least one dichroic layer; and
  a polarization conversion film located proximate to a surface of the waveguide opposite the exit surface, the polarization conversion film configured to transform the polarization of at least some of the S-polarized light rays reflected by the at least one dichroic layer to P-polarized light rays, and to reflect the transformed P-polarized light rays back into the waveguide such that at least a portion of the transformed P-polarized light rays may exit the waveguide and pass though the at least one dichroic layer.

17. An electronic display system in accordance with claim 16, wherein the at least one dichroic layer comprises a dichroic stack of at least three dichroic materials, stacked in alternating high and low refractive indices.

18. An electronic display system in accordance with claim 16, wherein the polarization conversion film comprises a birefringent film.

19. An electronic display system in accordance with claim 16, further comprising a cladding layer located between the at least one dichroic layer and the display panel, the cladding layer configured to redirect at least some exiting light rays to an angle approximately normal to the exit surface.

20. An electronic display system in accordance with claim 16, wherein the reflecting end further comprises a curvature extending along a plane substantially parallel to the exit surface's plane.

21. An electronic display system in accordance with claim 16, wherein the reflecting end comprises at least one corrugation on an internal surface thereof.

22. A method of illuminating an electronic display system, the method comprising:
  generating light rays using at least one illumination unit located proximate an optical waveguide comprising an exit surface having a critical angle above which light rays may exit the waveguide;

transmitting the generated light rays into the waveguide, wherein a portion of the transmitted light rays exit the waveguide through the exit surface;

locating at least one dichroic layer proximate to the exit surface of the waveguide;

passing exiting P-polarized light rays through the exit surface, while reflecting exiting S-polarized light rays back into the waveguide;

illuminating a display panel, configured to provide images for display, with at least a portion of the passed P-polarized light rays; and transforming at least some of the reflected S-polarized light rays into P-polarized light rays, and reflecting the transformed P-polarized light rays back towards the exit surface such that at least a portion of the transformed P-polarized light rays exit the waveguide, the method further comprising passing at least some of the transformed P-polarized light rays exiting the waveguide, and illuminating the display panel with at least a portion of the passed transformed P-polarized light rays.

23. A method in accordance with claim 22, wherein the method comprises passing exiting P-polarized light rays, and reflecting exiting S-polarized light rays, using the at least one dichroic layer located on the exit surface.

24. A method in accordance with claim 22, wherein the waveguide comprises a near end and a reflecting far end, a thickness of the waveguide at the reflecting far end being greater than a thickness at the near end, wherein at least a portion of the lights rays exiting the waveguide reflect off of the reflecting end.

25. A method in accordance with claim 24, wherein the reflecting far end comprises a curvature extending along a plane substantially parallel to the exit surface's plane.

26. A method in accordance with claim 24, wherein the reflecting far end comprises at least one corrugation on an internal surface thereof.

* * * * *